(12) United States Patent
Creaby et al.

(10) Patent No.: US 11,708,094 B2
(45) Date of Patent: Jul. 25, 2023

(54) TECHNIQUES FOR MAINTAINING VEHICLE FORMATIONS

(71) Applicant: Trimble Inc., Sunnyvale, CA (US)

(72) Inventors: Justin Creaby, Westminster, CO (US); Joshua Rands, Superior, CO (US); Brandon Sights, San Marcos, CA (US)

(73) Assignee: Trimble Inc., Sunnyvale, CA (US)

( * ) Notice: Subject to any disclaimer, the term of this patent is extended or adjusted under 35 U.S.C. 154(b) by 266 days.

(21) Appl. No.: 17/137,206

(22) Filed: Dec. 29, 2020

(65) Prior Publication Data

US 2022/0204052 A1 Jun. 30, 2022

(51) Int. Cl.
*B60W 60/00* (2020.01)

(52) U.S. Cl.
CPC ............... *B60W 60/00272* (2020.02); *B60W 60/00274* (2020.02)

(58) Field of Classification Search
CPC ...... B60W 60/00272; B60W 60/00274; G05D 2201/0201; G05D 1/0295
See application file for complete search history.

(56) References Cited

U.S. PATENT DOCUMENTS

| | | | |
|---|---|---|---|
| 10,890,922 B2 * | 1/2021 | Ramm | A01D 41/1277 |
| 2010/0256835 A1 | 10/2010 | Mudalige | |
| 2011/0112730 A1 | 5/2011 | Rekow | |
| 2013/0166157 A1 | 6/2013 | Schleicher et al. | |
| 2013/0231823 A1 * | 9/2013 | Wang | A01B 69/008 701/32.4 |
| 2017/0147005 A1 * | 5/2017 | Ramm | G05D 1/0295 |
| 2018/0364739 A1 * | 12/2018 | Foster | G05D 1/0219 |

FOREIGN PATENT DOCUMENTS

| | | |
|---|---|---|
| EP | 2 675 260 A1 | 12/2013 |
| EP | 3 123 850 A1 | 2/2017 |
| WO | 2012/112205 A1 | 8/2012 |

OTHER PUBLICATIONS

Extended European Search Report for Application No. 21215169.0-1004, dated May 25, 2022, 13 pages.

\* cited by examiner

*Primary Examiner* — Ryan Rink
(74) *Attorney, Agent, or Firm* — Kilpatrick Townsend & Stockton LLP

(57) ABSTRACT

A method of maintaining vehicle formation includes receiving a desired formation distance between a lead vehicle and a follower vehicle; receiving a pre-planned path for the follower vehicle; and defining a dynamic zone around a current position of the lead vehicle. The dynamic zone has a boundary characterized by a first radius from the current position of the lead vehicle. The first radius can be substantially equal to the desired formation distance. The method further includes determining a next speed of the follower vehicle based on a current position of the follower vehicle with respect to the boundary of the dynamic zone; determining a commanded curvature of the follower vehicle based on the current position of the follower vehicle with respect to the pre-planned path; and outputting the next speed and the commanded curvature to a control system of the follower vehicle for navigation of the follower vehicle.

20 Claims, 32 Drawing Sheets

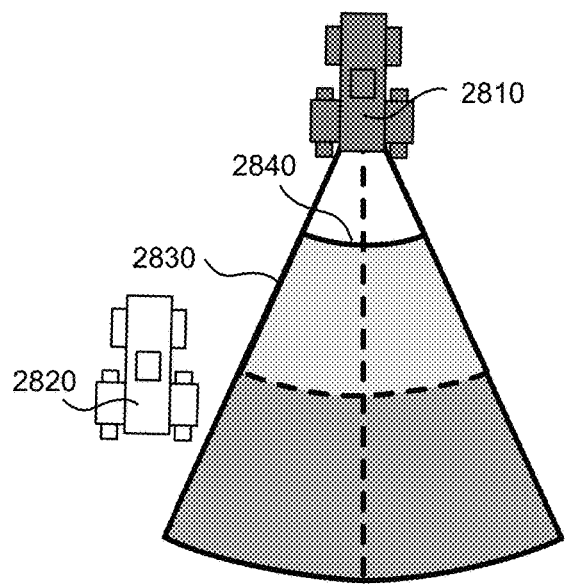
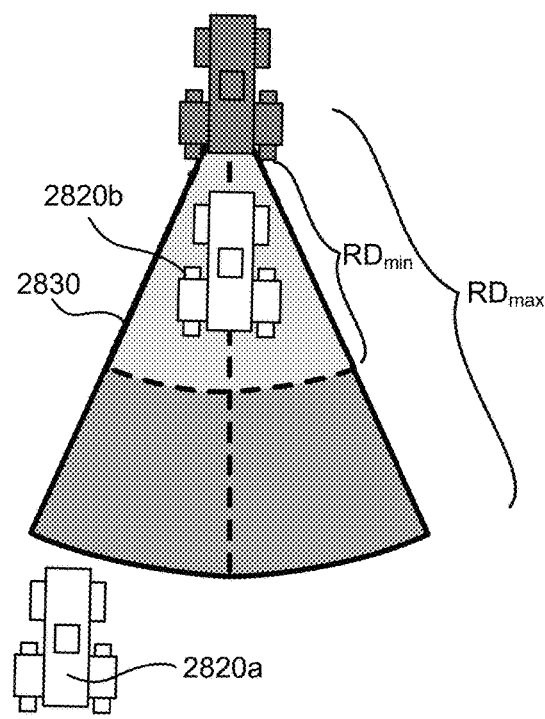
FIG. 28A  FIG. 28B
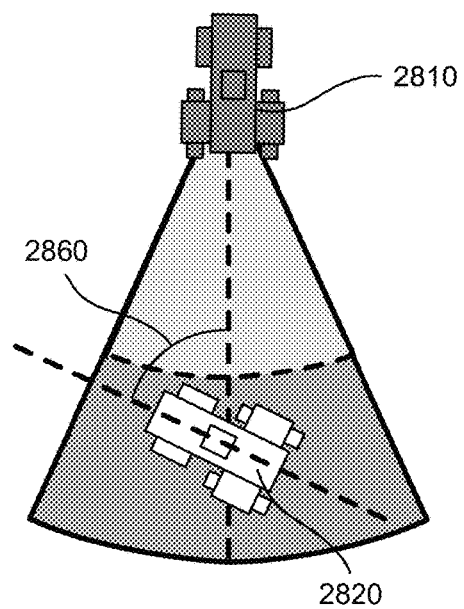
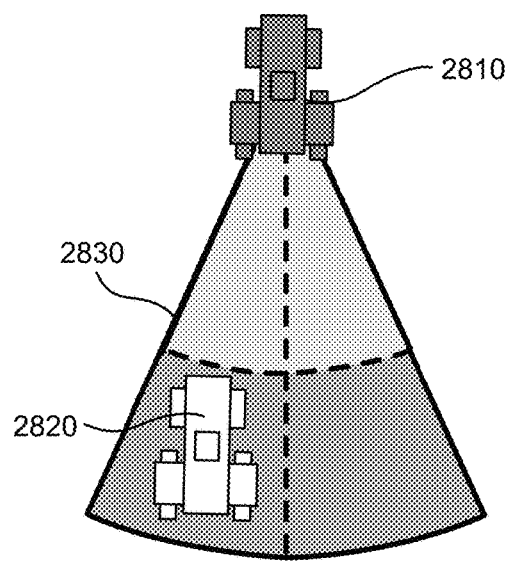
FIG. 28C  FIG. 28D

TECHNIQUES FOR MAINTAINING VEHICLE FORMATIONS

CROSS-REFERENCES TO RELATED APPLICATIONS

The following three U.S. Patent Applications (including this one) are being filed concurrently, and the entire disclosures of the other applications are incorporated by reference into this application for all purposes:

Application Ser. No. 17/137,206, filed Dec. 29, 2020, entitled TECHNIQUES FOR MAINTAINING VEHICLE FORMATIONS, and Application Ser. No. 17/137,199, filed Dec. 29, 2020, entitled TECHNIQUES FOR MAINTAINING OFFSETS IN VEHICLE FORMATIONS, and Application Ser. No. 17/137,202, filed Dec. 29, 2020, entitled PATH FOLLOWING IN VEHICLE FORMATIONS.

BACKGROUND

Vehicle formation can be applied in agriculture, construction, and other applications. For example, in harvesting, tillage, planting, and road grading, an autonomous follower vehicle can follow a lead vehicle that is driven by a human. It can be important that the follower vehicle maintains a desired formation distance (e.g., a radial distance or along track distance) and/or a desired offset (e.g., cross track offset and along track offset) from the lead vehicle. It can also be important that the follower vehicle follows the lead vehicle at a safe speed. Maintaining vehicle formation on curved paths or on turns can be challenging. For example, the desired formation can vary throughout a turn. Paths for each vehicle can vary depending on the curvature and the desired offset. For some applications, there can be a tradeoff between maintaining formation and following at a safe speed. For example, for harvesting, maintaining formation may be more important than following at a safe speed; whereas for tillage, maintaining formation and following at a safe speed may be equally important. In "follow me" type of formation, following at a safe speed may be more important. Therefore, there is a need for improved techniques for maintaining vehicle formations.

SUMMARY

According to some embodiments, a method of maintaining vehicle formation includes receiving a desired formation distance between a lead vehicle and a follower vehicle; receiving a pre-planned path for the follower vehicle; and defining a dynamic zone around a current position of the lead vehicle. The dynamic zone has a boundary characterized by a first radius from the current position of the lead vehicle. The first radius can be substantially equal to the desired formation distance. The method further includes determining a next speed of the follower vehicle based on a current position of the follower vehicle with respect to the boundary of the dynamic zone, so as to cause the follower vehicle to maintain the desired formation distance from the lead vehicle; determining a commanded curvature of the follower vehicle based on the current position of the follower vehicle with respect to the pre-planned path, so as to cause the follower vehicle to follow the pre-planned path while maintaining the desired formation distance from the lead vehicle; and outputting the next speed and the commanded curvature to a control system of the follower vehicle for navigation of the follower vehicle.

According to some embodiments, a method of maintaining vehicle formation includes receiving a desired formation distance between a lead vehicle and a follower vehicle; and defining a dynamic zone around a current position of the lead vehicle. The dynamic zone has a boundary characterized by a first radius from the current position of the lead vehicle. The first radius can be substantially equal to the desired formation distance. The method further includes determining a next speed and a commanded curvature of the follower vehicle based on the current position of the follower vehicle with respect to the boundary of the dynamic zone and a path of the lead vehicle, so as to cause the follower vehicle to follow the path of the lead vehicle while maintaining the desired formation distance from the lead vehicle; and outputting the next speed and the commanded curvature to a control system of the follower vehicle for navigation of the follower vehicle.

According to some embodiments, a method of maintaining vehicle formation includes receiving a desired cross track offset distance and a desired along track offset distance between a lead vehicle and a follower vehicle; receiving a current position, a current yaw rate, and a current speed of the lead vehicle; and determining a current turn radius of the lead vehicle based on the current yaw rate and the current speed of the lead vehicle. A current trajectory of the lead vehicle is along an arc of a first turn circle with the current turn radius. The method further includes determining a projected turn radius of the follower vehicle based on the current turn radius of the lead vehicle, the desired cross track offset distance, and the desired along track offset distance; determining a commanded curvature and a next speed of the follower vehicle based on a current position of the follower vehicle with respect to the current position of the lead vehicle and the projected turn radius of the follower vehicle, so as to cause the follower vehicle to move along an arc of a second turn circle having the projected turn radius while maintaining the desired cross track offset distance and the desired along track offset distance from the lead vehicle; and outputting the next speed and the commanded curvature to a control system of the follower vehicle for navigation of the follower vehicle.

According to some embodiments, a method of maintaining vehicle formation includes receiving a desired cross track offset distance and a desired along track offset distance between a lead vehicle and a follower vehicle; receiving a current position, a current yaw rate, and a current speed of the lead vehicle; and determining a current turn radius of the lead vehicle based on the current yaw rate and the current speed of the lead vehicle. The current position of the lead vehicle is on a first turn circle with the current turn radius. The method further includes determining a projected turn radius of the follower vehicle based on the current turn radius of the lead vehicle, the desired cross track offset distance, and the desired along track offset distance; determining a commanded curvature and a next speed of the follower vehicle based on a current position of the follower vehicle with respect to the current position of the lead vehicle and the projected turn radius of the follower vehicle, so as to cause the follower vehicle to move along an arc of a second turn circle that is concentric with the first turn circle and has the projected turn radius, while maintaining the desired cross track offset distance and the desired along track offset distance from the lead vehicle; and outputting the next speed and the commanded curvature to a control system of the follower vehicle for navigation of the follower vehicle.

According to some embodiments, a method of maintaining vehicle formation includes receiving a desired along path distance between a lead vehicle and a follower vehicle; and receiving a plurality of waypoints corresponding to a plurality of positions along a path of the lead vehicle up to a current time. Each respective waypoint includes a respective position and a respective waypoint speed of the lead vehicle at the respective position. The method further includes determining a dynamic path for the follower vehicle by spline fitting the plurality of positions of the plurality of waypoints; determining a commanded curvature of the follower vehicle based on a curvature of the dynamic path at a current position of the follower vehicle; determining a current along path distance between the lead vehicle and the follower vehicle; determining an along path error based on the current along path distance and the desired along path distance; determining a next speed of the follower vehicle based on the along path error and the respective waypoint speed of the respective waypoint that is adjacent to a current position of the follower vehicle; and outputting the commanded curvature and the next speed to a control system of the follower vehicle to control navigation of the follower vehicle, so that the follower vehicle follows the dynamic path.

According to some embodiments, a method of maintaining vehicle formation includes receiving a desired along path distance between a lead vehicle and a follower vehicle; and receiving a plurality of waypoints corresponding to a plurality of positions along a path of the lead vehicle up to a current time. Each respective waypoint includes a respective position of the lead vehicle. The method further includes determining a dynamic path for the follower vehicle by spline fitting the plurality of positions of the plurality of waypoints; determining a commanded curvature of the follower vehicle based on a curvature of the dynamic path at a current position of the follower vehicle; determining a current along path distance between the lead vehicle and the follower vehicle; determining an along path error based on the current along path distance and the desired along path distance; determining a next speed of the follower vehicle based on the along path error; and outputting the commanded curvature and the next speed to a control system of the follower vehicle to control navigation of the follower vehicle, so that the follower vehicle follows the dynamic path.

BRIEF DESCRIPTION OF THE DRAWINGS

FIGS. 28A-28D illustrate some exemplary initial conditions for engaging following according to some embodiments.

DETAILED DESCRIPTION

Figure 1:
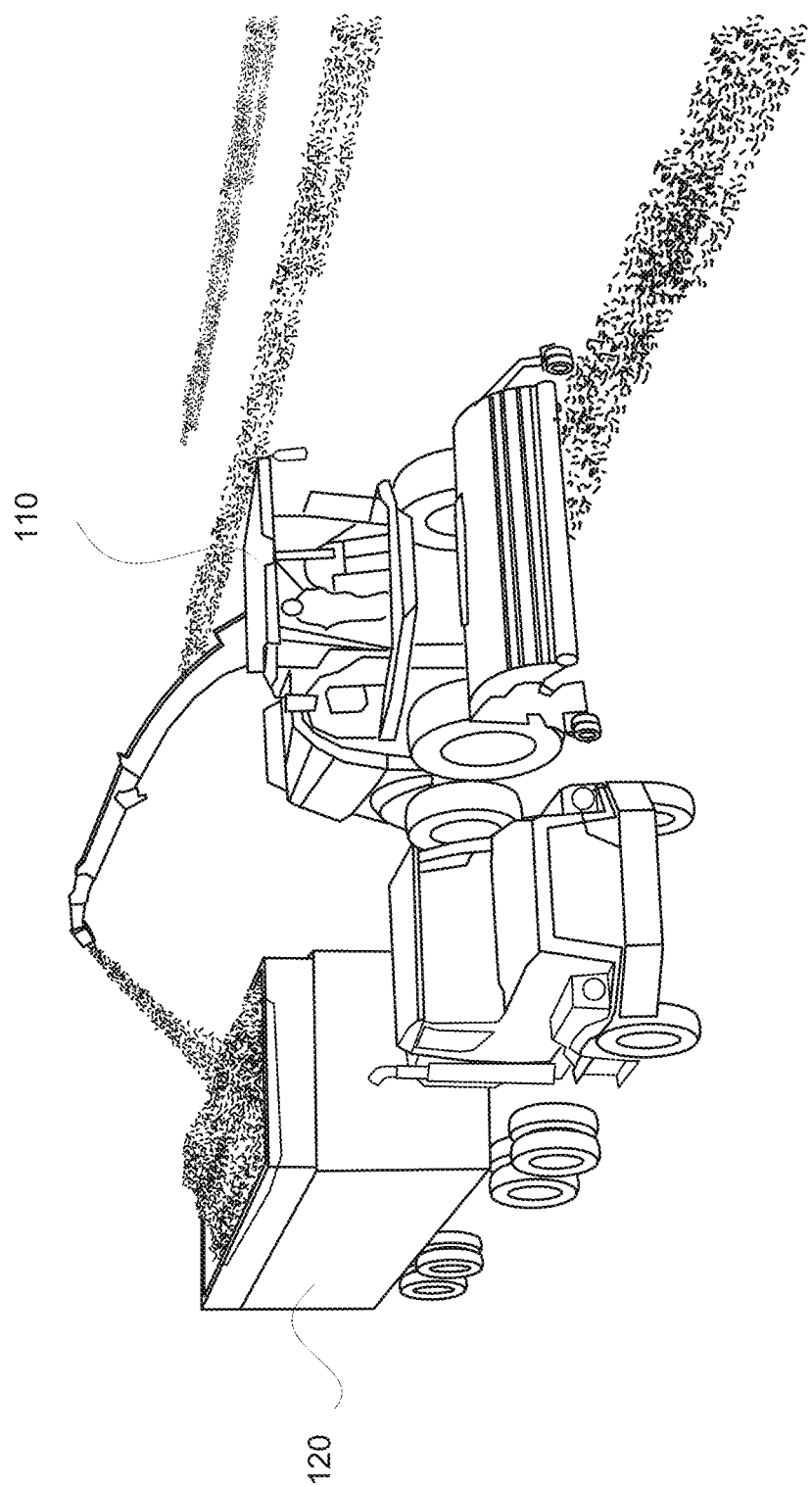
FIG. 1 shows an example of vehicle formation for harvesting.

According to various embodiments, techniques for maintaining vehicle formation are provided. FIG. 1 shows an example of vehicle formation for harvesting. The lead vehicle 110 can be a harvester and can be driven by a human operator. The follower vehicle 120 can be a cart and can be an autonomous vehicle. The lead vehicle 110 can transfer harvested grain to the cart 120 while it harvests a field swath by swath. It can be important that the cart 120 maintains an exact left-right and forward-back offsets from the harvester 110, so that the cart is evenly filled. It can be important that the relative offsets are maintained even on turns. In such applications, the follower vehicle 120 (e.g., a cart) may be referred to as a supervised autonomous vehicle or simply an autonomous vehicle.

A. Maintaining Formation Distance

According to some embodiments, techniques for maintaining formation distance are provided. Maintaining formation distance can be important for synchronized task completion. For example, for tilling a field, the driver of the lead vehicle may want to maintain a close but safe distance to the follower vehicle.

Figure 2:
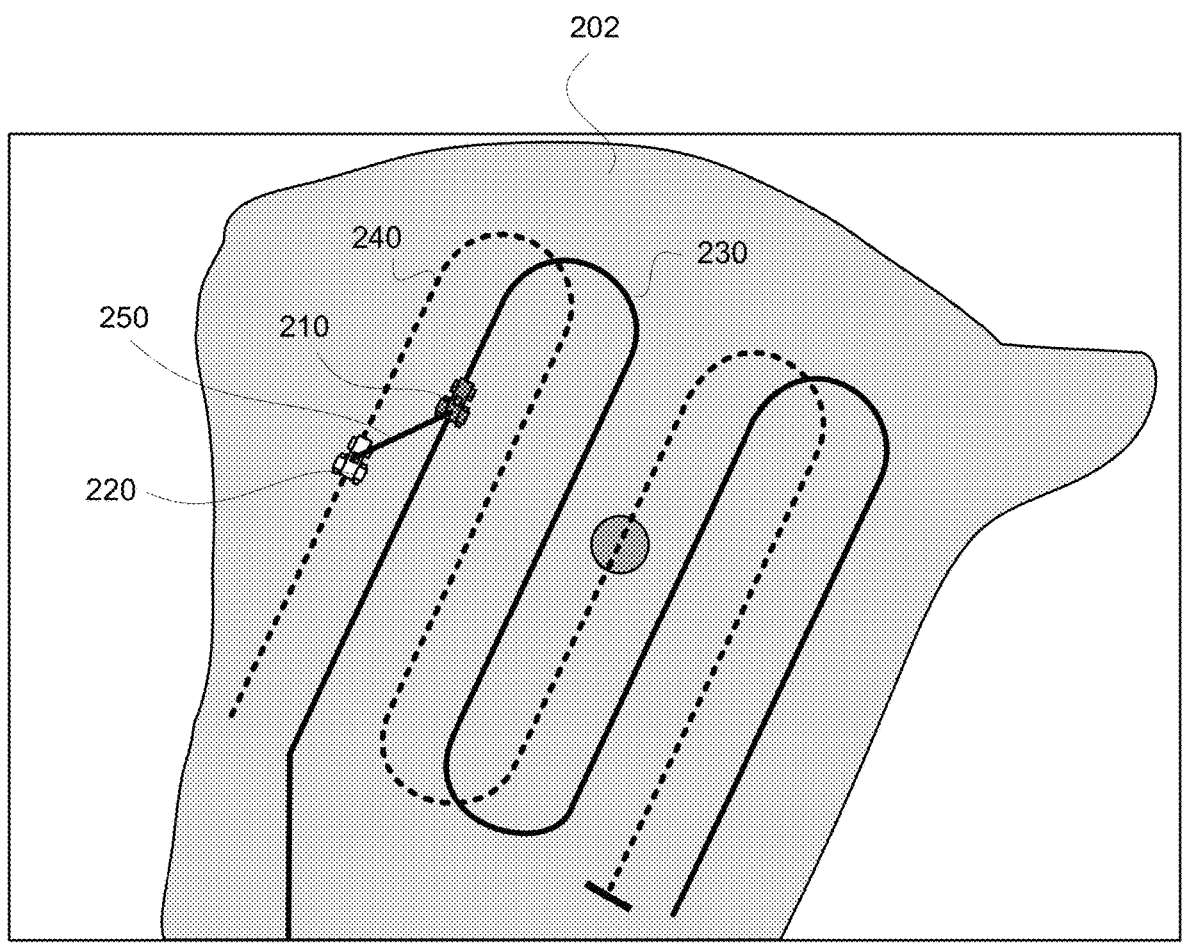
FIG. 2 illustrates an example of vehicle formation for working a field according to some embodiments.

FIG. 2 illustrates an example of vehicle formation for working a field 202 (e.g., tilling, harvesting, planting, etc.). There may be pre-planned paths 230 and 240 in the field 202 for a lead vehicle 210 and a follower vehicle 220 to follow, respectively. For example, the pre-planned path 230 for the lead vehicle 210 can include straight sections along swaths of the field 202, and curved sections for transitioning from one swath to a next swath (e.g., U-shaped turns). The pre-planned path 240 for the follower vehicle 220 can be substantially parallel to the pre-planned path 230 for the lead vehicle 210. It may be desired that the follower vehicle 220 travels alongside the lead vehicle 210 while keeping a certain radial distance 250 from the lead vehicle 210. For example, it can be important that the radial distance between the lead vehicle 210 and the follower vehicle 220 be maintained so as to achieve coordinated completion of a task. According to some embodiments, to maintain a desired formation distance between the lead vehicle 210 and the follower vehicle 220, a semi-circular zone can be created behind or in front of the lead vehicle 210, as discussed in more detail below.

Figure 3A:
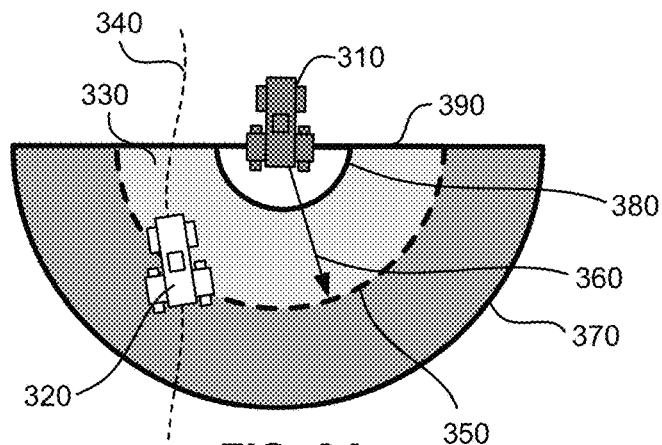
FIGS. 3A and 3C illustrate methods of maintaining formation distance in a pull mode according to some embodiments.

FIG. 3A illustrates a method of maintaining formation distance in a pull mode, in which a lead vehicle 310 "pulls" a follower vehicle 320. A dynamic zone 330 (light shaded region) behind the lead vehicle 310 can be defined. The dynamic zone 330 has a boundary 350 that is characterized by a semicircle centered at the current position of the lead vehicle 310. The current position of the lead vehicle 310 can be the current position of a control point of the lead vehicle 310. The radius 360 of the semicircle 350 can be the desired formation distance between the lead vehicle 310 and the follower vehicle 320. The desired formation distance can be the desired radial distance between the control point of the lead vehicle 310 and a control point of the follower vehicle 320. For example, if the follower vehicle 320 includes a cart, the control point of the follower vehicle 320 can be the center of the cart. The diameter 390 of the semicircle 350 can be substantially normal to a current heading of the lead vehicle 310 (e.g., the dynamic zone 330 is directly behind the lead vehicle 310).

According to some embodiments, the dynamic zone 330 can be used to control the speed of the follower vehicle 320. For example, if the current position of the follower vehicle 320 is inside the dynamic zone 330, the system may decrease the speed of the follower vehicle 320 so that the follower vehicle 320 will slow down and maintain the desired radial distance from the lead vehicle 310. On the other hand, if the current position of the follower vehicle 320 is outside the dynamic zone 330, the system may increase the speed of the follower vehicle 320 so that the follower vehicle 320 will speed up to maintain the desired radial distance from the lead vehicle 310. If the current position of the follower vehicle 320 is on the boundary 350 of the dynamic zone 330, the system can maintain the current speed of the follower vehicle 320. In some embodiments, if there is a pre-planned path 340 for the follower vehicle 320, the system can steer the follower vehicle 320 to follow the pre-planned path 340 while maintaining the desired radial distance.

In some embodiments, a dynamic geo-fence can be created. The system can cause the follower vehicle 320 to stop when the follower vehicle 320 moves beyond the geo-fence for any reason. For example, referring to FIG. 3A, the dynamic geo-fence (thick solid line) can have a first boundary defined by a first semicircle 380 and a second boundary defined by a second semicircle 370. The radius of the first semicircle 380 can be a minimum radial distance between the lead vehicle 310 and the follower vehicle 320. The radius of the second semicircle 370 can be a maximum radial distance between the lead vehicle 310 and the follower vehicle 320. If the follower vehicle 320 moves outside the dynamic geo-fence, e.g., the follower vehicle 320 is inside the first semicircle 380 or outside the second semicircle 370, the system can cause the follower vehicle 310 to stop.

Figure 3B:
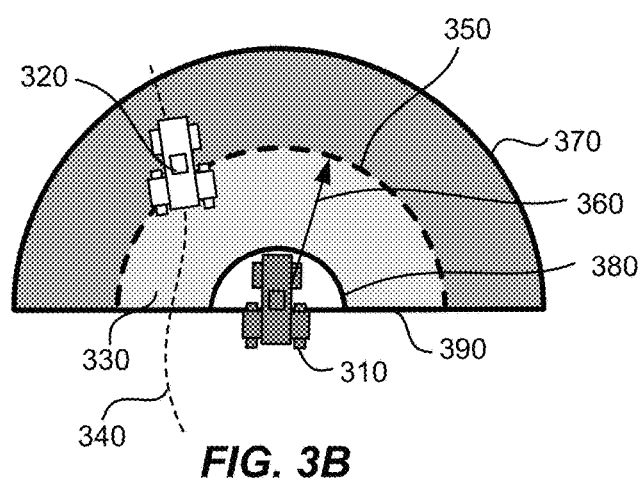
FIGS. 3B and 3D illustrate methods of maintaining formation distance in a push mode according to some embodiments.

FIG. 3B illustrates a method of maintaining formation distance in a push mode, in which a lead vehicle 310 "pushes" the follower vehicle 320. Here, the dynamic zone 330 is in front of the lead vehicle 310 instead of behind the lead vehicle 310. If the current position of the follower vehicle 320 is inside the dynamic zone 330, the system may increase the speed of the follower vehicle 320 so that the follower vehicle 320 will speed up to maintain the desired radial distance from the lead vehicle 310. On the other hand, if the current position of the follower vehicle 320 is outside the dynamic zone 330, the system may decrease the speed of the follower vehicle 320 so that the follower vehicle 320 will slow down to maintain the desired radial distance from the lead vehicle 310. Similarly, the dynamic geo-fence is also in front of the lead vehicle 310 instead of behind the lead vehicle 310.

Figure 3C:
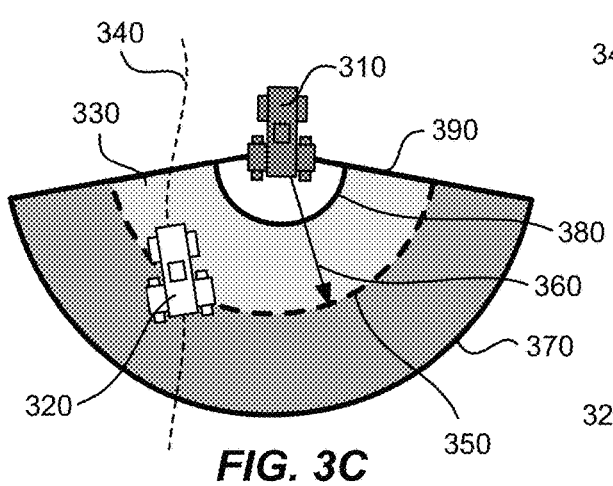
Figure 3D:
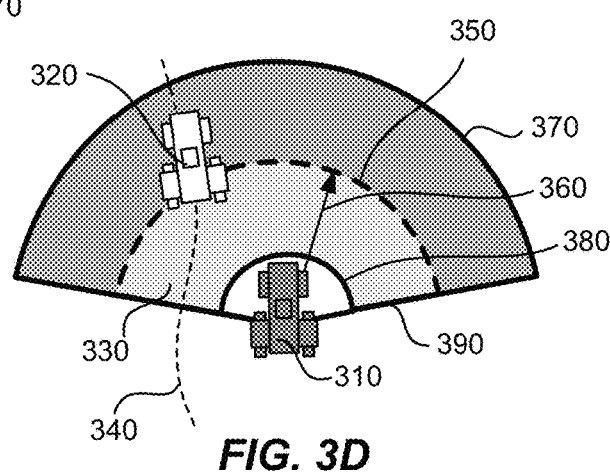

Although semi-circular zones are illustrated in FIGS. 3A and 3B as examples, zones with other shapes can also be constructed. For example, as illustrated in FIGS. 3C and 3D, the dynamic zone 330 can be a section of a circle with a central angle that is less than 180 degrees. The dynamic zone 330 is also directly behind or in front of the lead vehicle 310.

Figure 4A:
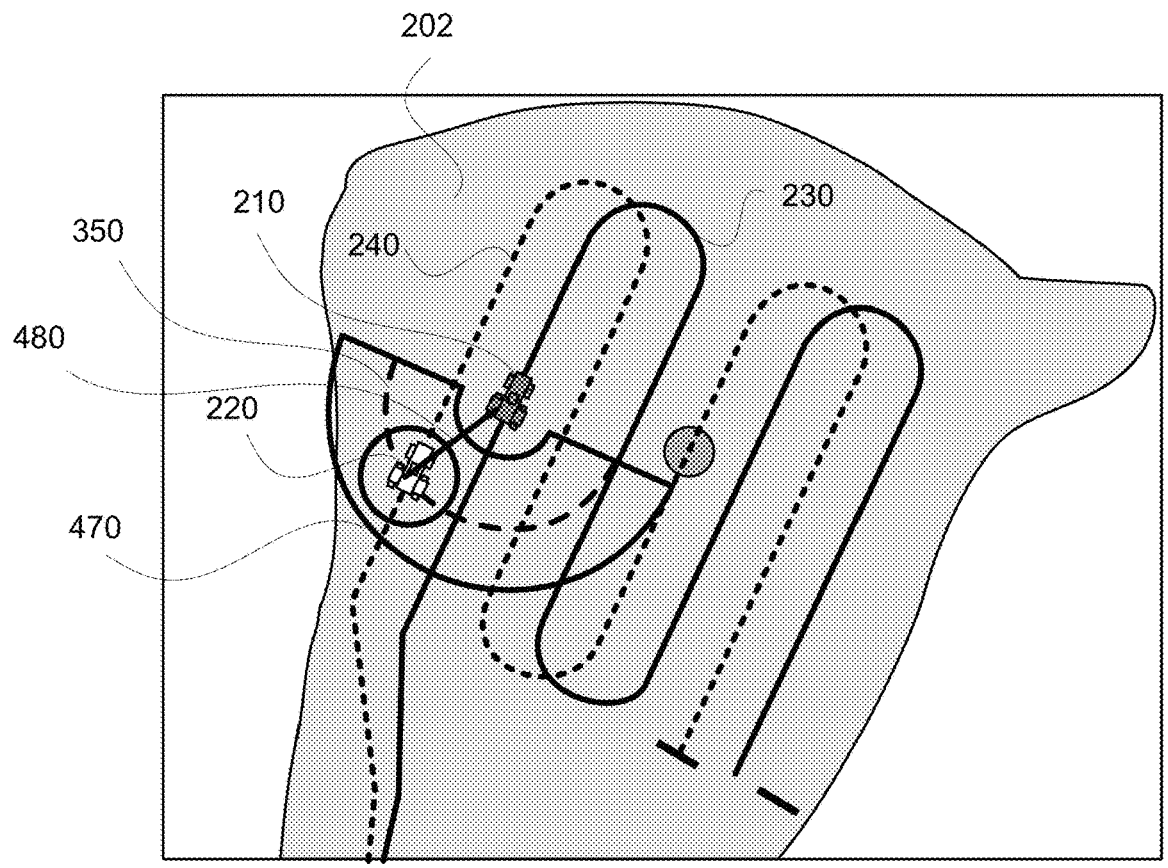
FIGS. 4A-4B and 5A-5B show some snapshots of a simulation of the navigations of the lead vehicle and the follower vehicle in the field illustrated in FIG. 2, according to some embodiments.
Figure 4B:
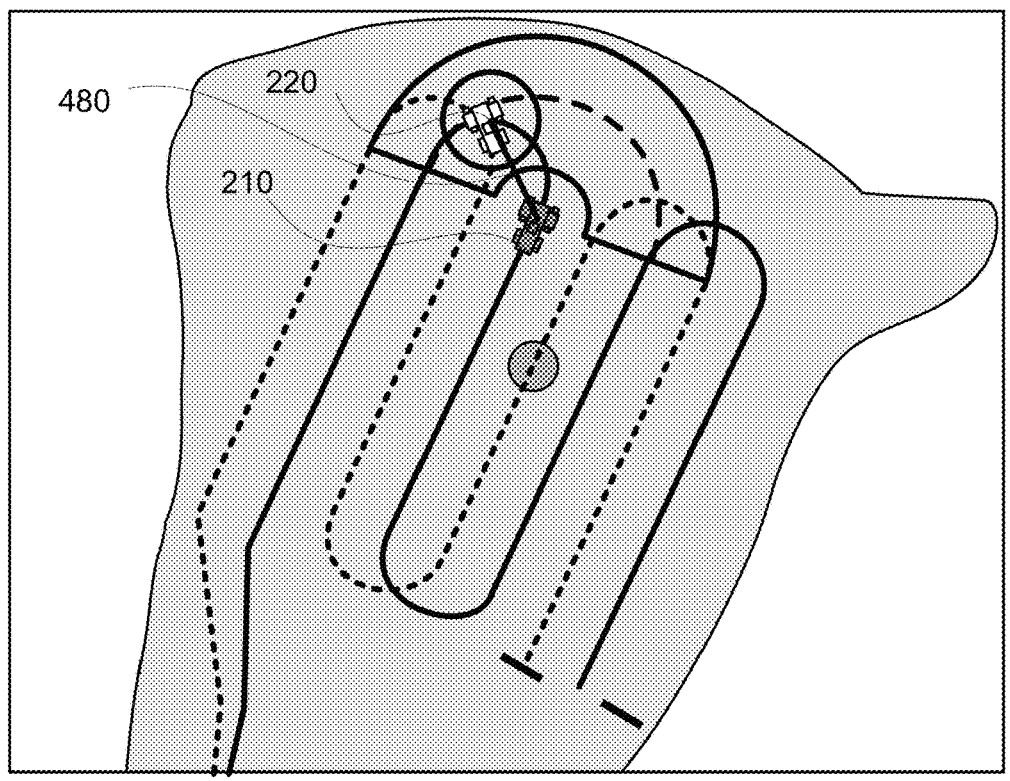

FIGS. 4A and 4B show two snapshots of a simulation of the navigations of the lead vehicle 210 and the follower vehicle 220 in the field 202 illustrated in FIG. 2, according to some embodiments. In FIG. 4A, the lead vehicle 210 and the follower vehicle 220 are traveling in straight sections of the pre-planned paths 230 and 240, respectively, in a pull mode. The dynamic semicircle 350 moves with the lead vehicle 210 to guide the speed of the follower vehicle 220. As illustrated, the follower vehicle 220 travels along the pre-planned path 240 alongside the lead vehicle 210, while maintaining a radial distance 480 behind the lead vehicle 210. The dynamic geo-fence 470 (the thick solid line) can provide a boundary for the movement of the follower vehicle 220. In FIG. 4B, the lead vehicle 210 and the follower vehicle 220 are traveling in curved sections of the pre-planned paths 230 and 240, respectively, as they are turning from one swath to a next swath. As illustrated, the radial distance 480 between the lead vehicle 210 and the follower vehicle 220 can be maintained even through the turns.

Figure 5A:
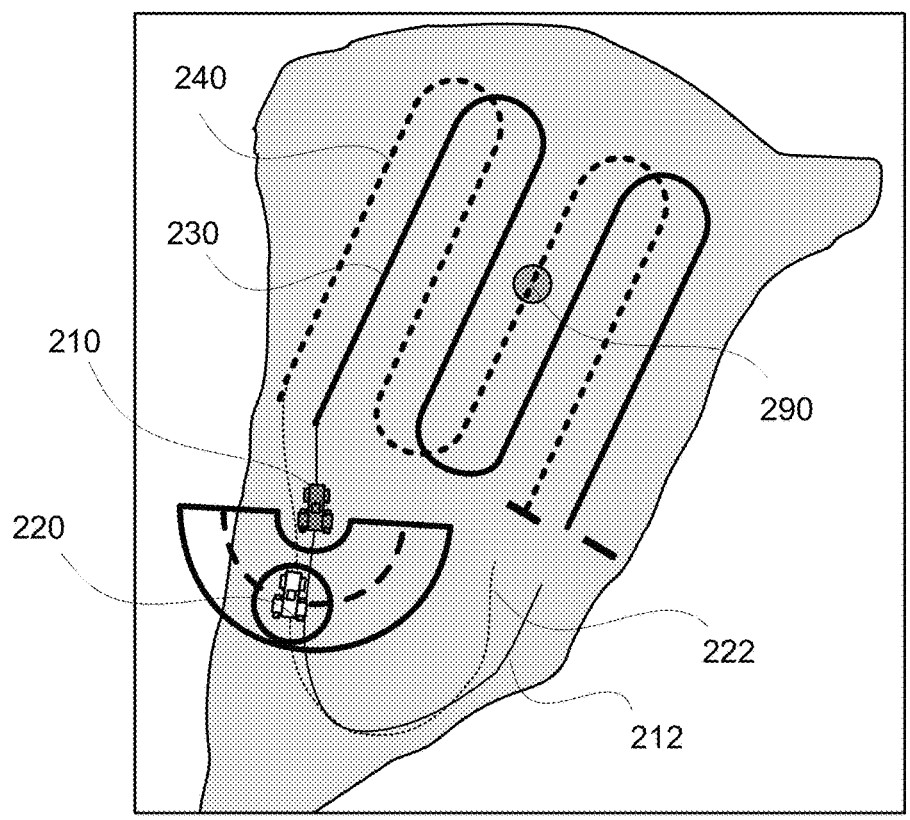

According to some embodiments, when there exists no pre-planned paths, the system can cause the follower vehicle 220 to follow the path of the lead vehicle 210 in a "follow me" mode. For example, as illustrated in FIG. 5A, as the lead vehicle 210 is driving from a parked position toward the beginning of the pre-planned path 230, the path 222 of the follower vehicle 220 can substantially follow the path 212 of the lead vehicle 210.

Figure 5B:
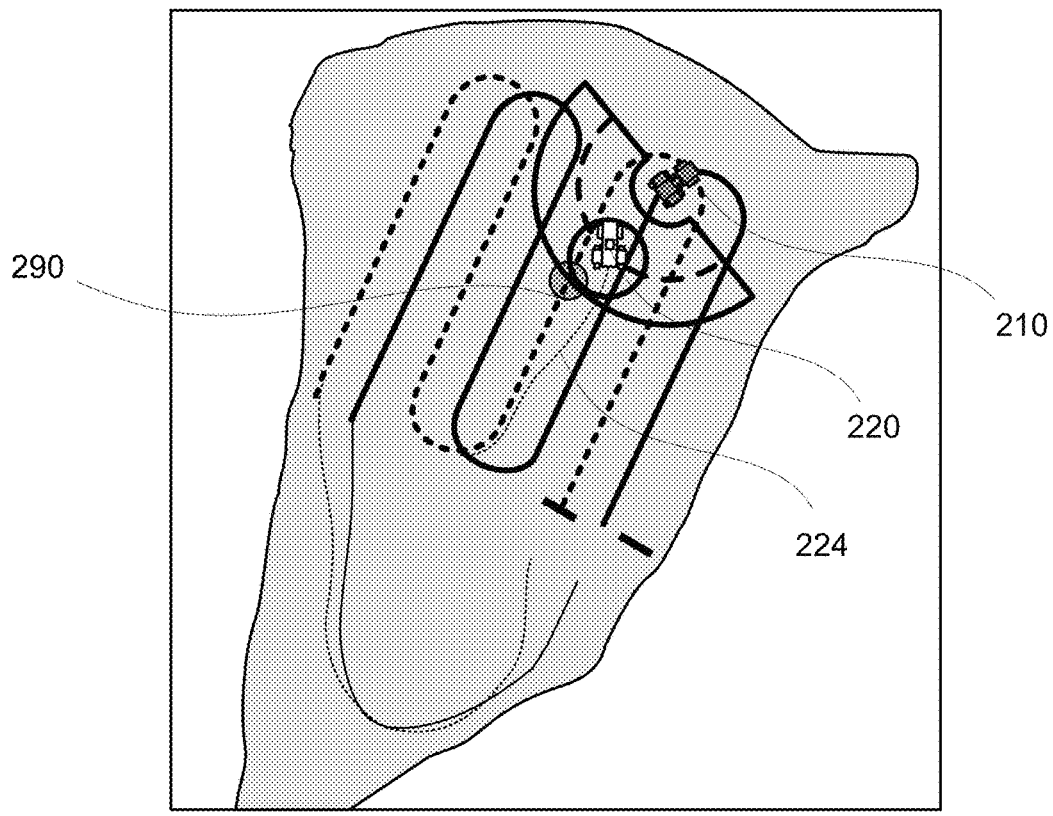

According to some embodiments, when encountering an obstacle, the system can cause the follower vehicle 220 to follow the path of the lead vehicle 210, instead of following the pre-planned path 240 for the follower vehicle 220. For example, as illustrated in FIG. 5B, there is an obstacle 290 along the pre-planned path 240 for the follower vehicle 220. The path 224 of the follower vehicle 220 deviates from the pre-planned path 240 and follows substantially the path of the lead vehicle 210. After the obstacle 290 has been passed, the follower vehicle 220 can be steered back to follow the pre-planned path 240 again.

Figure 6:
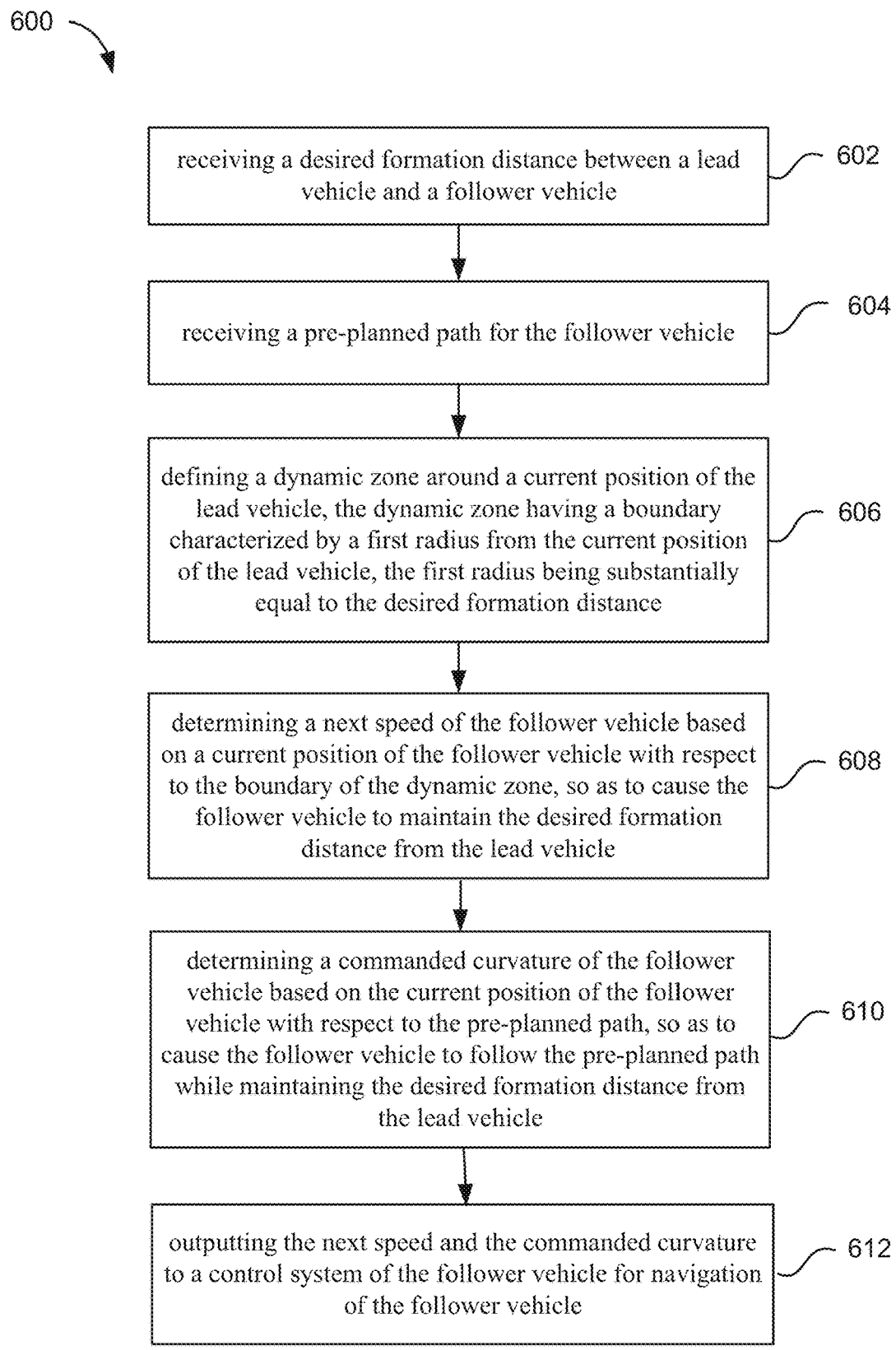
FIG. 6 is a simplified flowchart illustrating a method of maintaining vehicle formation according to some embodiments.

FIG. 6 is a simplified flowchart illustrating a method 600 of maintaining vehicle formation according to some embodiments.

The method 600 includes, at 602, receiving a desired formation distance between a lead vehicle and a follower vehicle; and at 604, receiving a pre-planned path for the follower vehicle.

The method 600 further includes, at 606, defining a dynamic zone around a current position of the lead vehicle. The dynamic zone has a boundary characterized by a first radius from the current position of the lead vehicle. The first radius can be substantially equal to the desired formation distance.

The method 600 further includes, at 608, determining a next speed of the follower vehicle based on a current position of the follower vehicle with respect to the boundary of the dynamic zone, so as to cause the follower vehicle to maintain the desired formation distance from the lead vehicle.

The method 600 further includes, at 610, determining a commanded curvature of the follower vehicle based on the current position of the follower vehicle with respect to the pre-planned path, so as to cause the follower vehicle to follow the pre-planned path while maintaining the desired formation distance from the lead vehicle.

The method 600 further includes, at 612, outputting the next speed and the commanded curvature to a control system of the follower vehicle for navigation of the follower vehicle.

It should be appreciated that the specific steps illustrated in FIG. 6 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
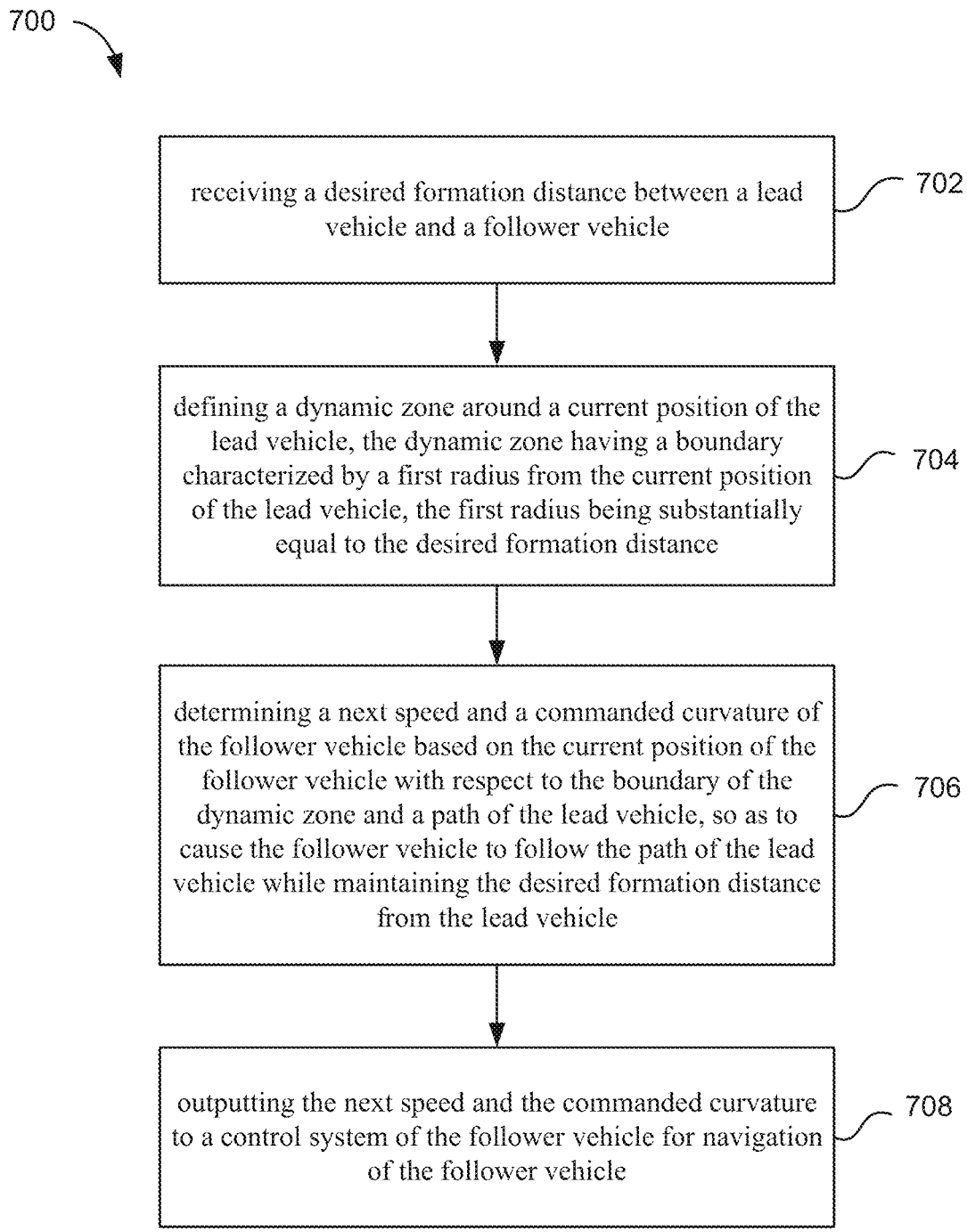
FIG. 7 is a simplified flowchart illustrating a method of maintaining vehicle formation according to some embodiments.

FIG. 7 is a simplified flowchart illustrating a method 700 of maintaining vehicle formation according to some embodiments.

The method 700 includes, at 702, receiving a desired formation distance between a lead vehicle and a follower vehicle.

The method 700 further includes, at 704, defining a dynamic zone around a current position of the lead vehicle. The dynamic zone has a boundary characterized by a first radius from the current position of the lead vehicle. The first radius can be substantially equal to the desired formation distance.

The method 700 further includes, at 706, determining a next speed and a commanded curvature of the follower vehicle based on the current position of the follower vehicle with respect to the boundary of the dynamic zone and a path of the lead vehicle, so as to cause the follower vehicle to follow the path of the lead vehicle while maintaining the desired formation distance from the lead vehicle.

The method of claim 700 further includes, at 708, outputting the next speed and the commanded curvature to a control system of the follower vehicle for navigation of the follower vehicle.

It should be appreciated that the specific steps illustrated in FIG. 7 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

B. Maintaining Offsets in Vehicle Formations

For some applications, it can be important to maintain an exact offset (e.g., left-right and forward-back offset) between a lead vehicle and a follower vehicle. For instance, in the harvesting example illustrated in FIG. 1, to ensure that the cart 120 is evenly filled, an exact offset between the harvesting vehicle 110 and the cart 120 may need to be maintained, even along curved paths or turns. Maintaining exact offset can be challenging along curved paths. Techniques for maintaining exact offset between a lead vehicle and a follower vehicle are provided according to some embodiments.

Figure 8A:
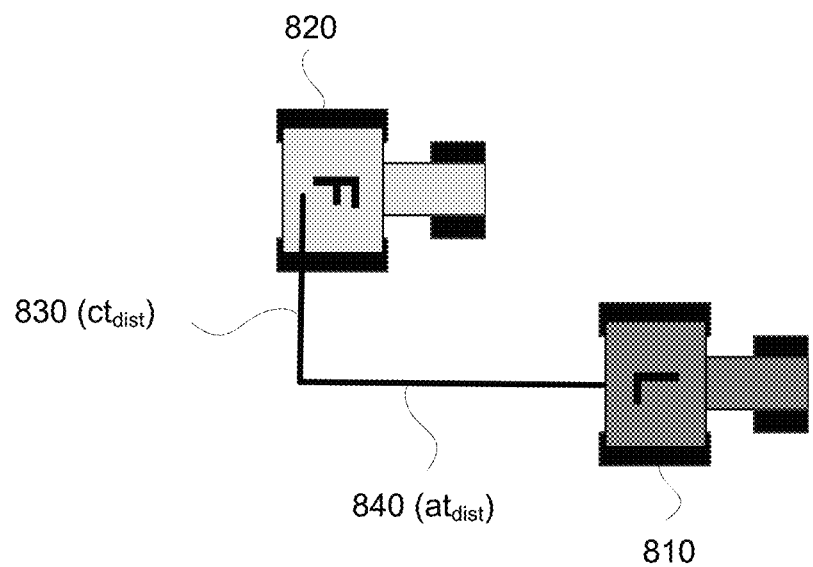
FIGS. 8A and 8B illustrate relative positions between a lead vehicle and a follower vehicle in a vehicle formation according to some embodiments.
Figure 8B:
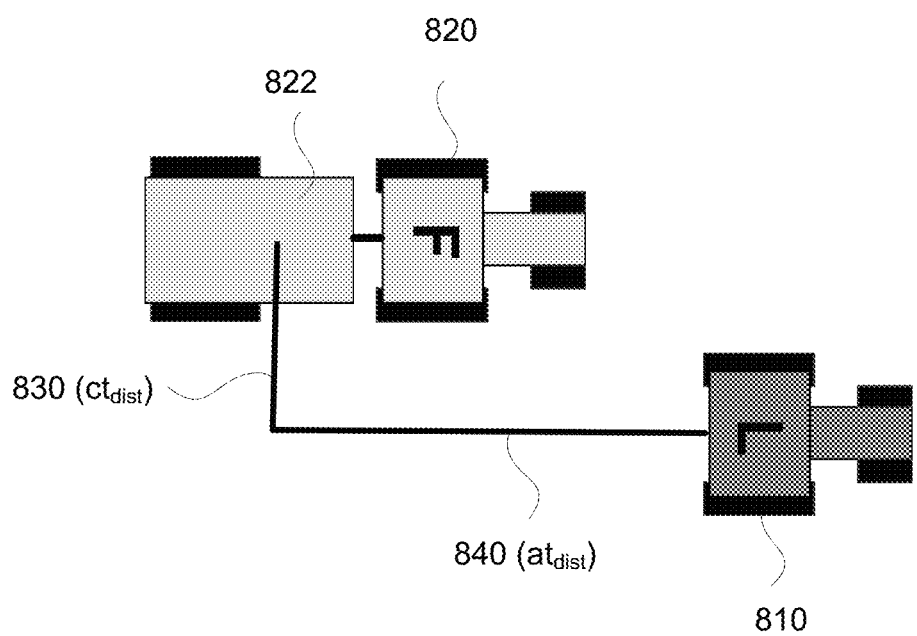

FIG. 8A illustrates relative positions between a lead vehicle 810 and a follower vehicle 820. The follower vehicle 820 may follow the lead vehicle 810 at a left-right offset distance 830 and a forward-back offset distance 840. The left-right offset distance 830 may be referred to as the cross track offset distance; the forward-back offset distance 840 may be referred to as the along track offset distance. FIG. 8B illustrates another example of relative positions between a lead vehicle 810 and a follower vehicle 820 according to some embodiments. In this example, the follower vehicle 820 has an implement 822 (e.g., a cart) attached to it. The along track offset distance 840 can be an along track distance between a control point of the lead vehicle 810 and a reference point of the implement 822 (e.g., the center of a cart or some other reference point).

Existing techniques for maintaining offset using straight line trajectory can accrue a cross track error (xte) when following curved paths, which can result in disengagement of the vehicle formation. According to some embodiments, the current turn radius of the lead vehicle 810 can be calculated using its current yaw rate and current speed. A projected turn radius of the follower vehicle 820 can then be calculated based on the current turn radius of the lead vehicle 810 and the desired offset.

Figure 9:
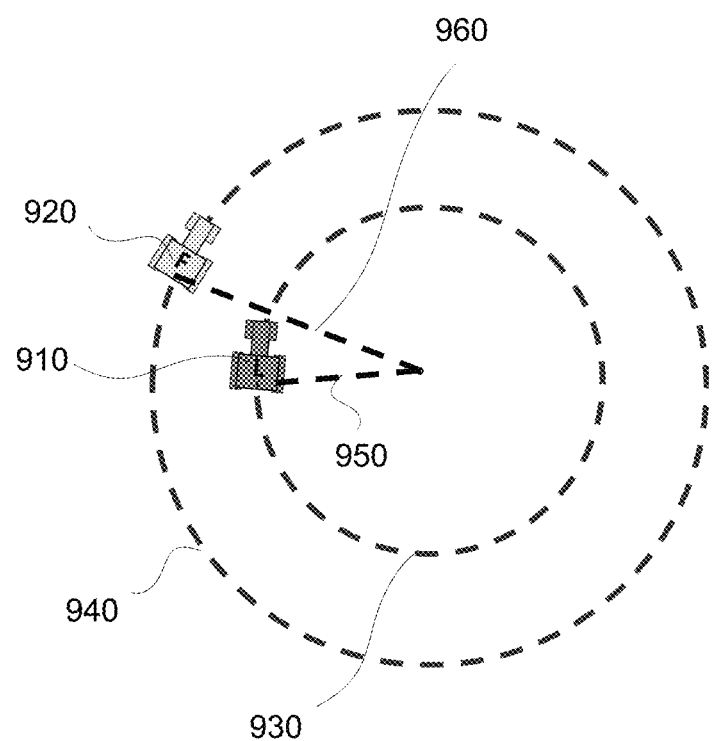
FIG. 9 illustrates a technique for maintaining offset during a turn according to some embodiments.

FIG. 9 illustrates a technique for maintaining offset during a turn according to some embodiments. Assume that a current trajectory of a lead vehicle 910 has a turn radius R. A first turn circle 930 with a radius 950 equal to R can be constructed, so that the current trajectory of the lead vehicle 910 is along an arc of the first turn circle 930. A second turn circle 940 can be constructed to be concentric with the first turn circle 930. Thus, the trajectory of the follower vehicle 920 can be along an arc of the second turn circle 940. The position of the follower vehicle 920 on the second turn circle 940 relative to the position of the lead vehicle 910 on the first turn circle 930 can be determined based on the desired along track offset distance $at_{dist}$. When the desired along track offset distance $at_{dist}$ is zero, the radius 960 of the second turn circle 940 can be equal to R plus the desired cross track offset distance $ct_{dist}$. As discussed below with references to FIGS. 12A-12B and 13, when the desired along track offset distance $at_{dist}$ is non-zero, the radius of the second turn circle 940 for the follower vehicle can be different from R+$ct_{dist}$.

Figure 10A:
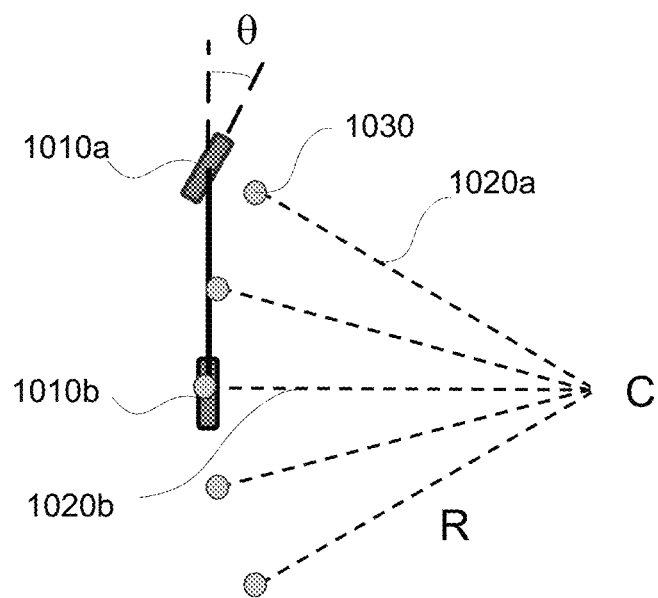
FIGS. 10A and 10B illustrate a method of extrapolating path points for the lead vehicle and the follower vehicle along turn circles using a bicycle model according to some embodiments.
Figure 10B:
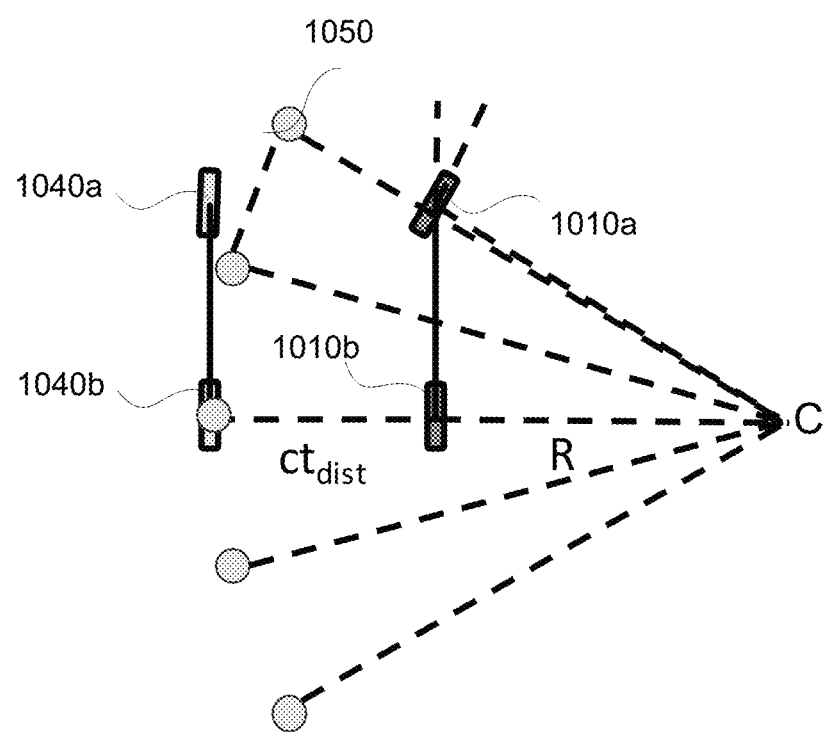

FIGS. 10A and 10B illustrate a method of extrapolating path points for the lead vehicle and the follower vehicle along turn circles using a bicycle model according to some embodiments. Referring to FIG. 10A, in the bicycle model of the lead vehicle, the two front wheels are represented by a first wheel 1010a, and the vehicle body is represented by a second wheel 1010b. When the lead vehicle is turning, the orientation of the first wheel 1010a and heading of the vehicle body 1010b are not aligned. The angle θ between the first wheel 1010a and the vehicle body 1010b can be estimated to be the steering angle of the lead vehicle.

The steering angle of the lead vehicle can be estimated from the yaw rate and the speed of the lead vehicle. From the steering angle θ, a first turn circle of the lead vehicle can be extrapolated. For example, a straight line 1020a perpendicular to the first wheel 1010a and a straight line 1020b perpendicular to the second wheel 1010b may intersect at a point C. The first turn circle can be centered at the point C. The radius R of the first turn circle can be calculated to be the distance from the point C to the control point (e.g., the rear axle) of the lead vehicle. Therefore, a plurality of path points 1030 for the lead vehicle can be extrapolated along the first turn circle, e.g., at 5 degrees intervals around the circle.

Referring to FIG. 10B, the path points 1050 for the follower vehicle can be extrapolated along a second turn circle that is concentric with the first turn circle, but with a radius that is equal to R+$ct_{dist}$, where $ct_{dist}$ is the desired cross track offset distance. Each path point 1050 represents a respective location of the control point of the follower vehicle.

According to some embodiments, the yaw rate for the follower vehicle may be limited to a maximum yaw rate. For example, the maximum yaw rate may be set at 20 degrees/second. According to some embodiments, a low pass filter (e.g., a first order low pass filter) may be applied to the steering angle of the lead vehicle to filter out high frequency noise. According to some embodiments, the trajectory can be recalculated when the filtered steering angle of the lead vehicle changes more than a predetermined value (e.g., more than 1 degree).

Figure 11:
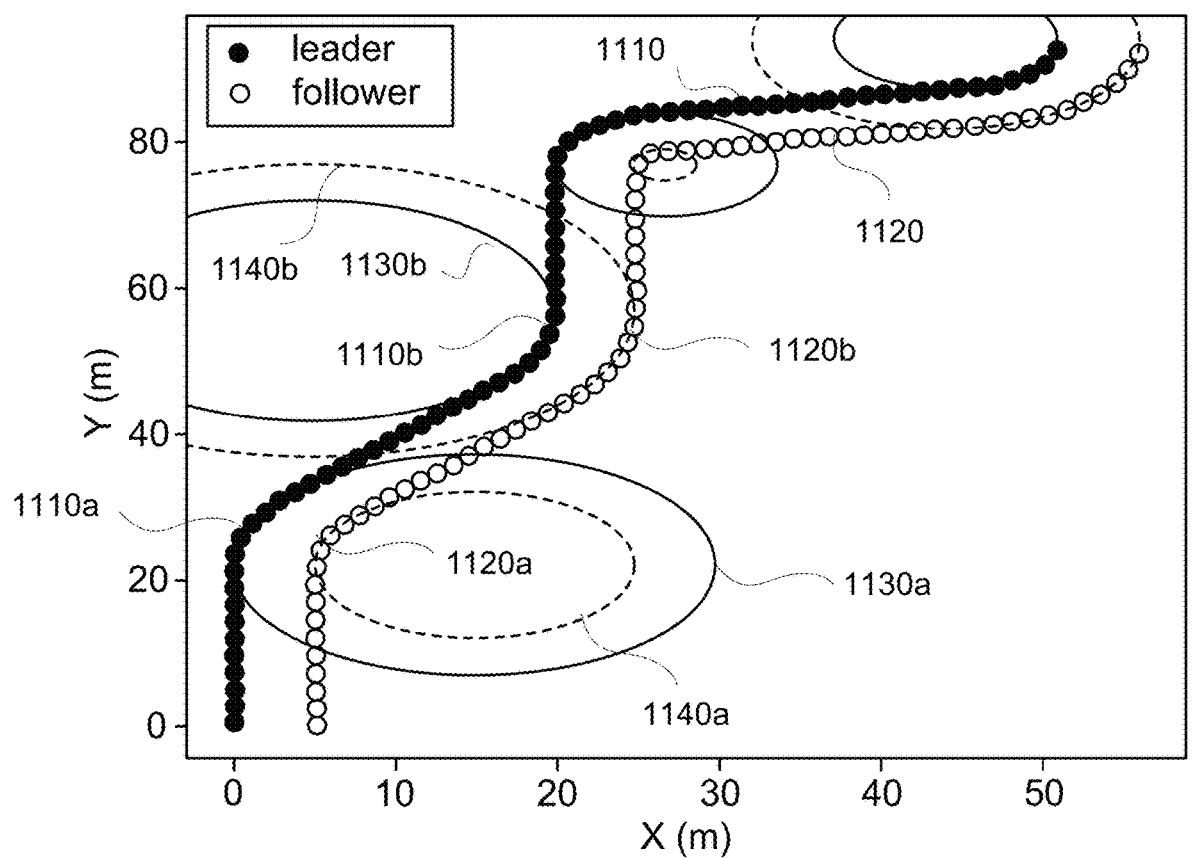
FIG. 11 shows a simulated path of a lead vehicle and a simulated path of a follower vehicle with a fixed cross track offset distance and no along track offset distance, according to some embodiments.

FIG. 11 shows a simulated path of a lead vehicle and a simulated path of a follower vehicle with a fixed cross track offset distance and no along track offset distance (e.g., the desired along track offset distance is zero), according to some embodiments. The solid dots 1110 represent the path points of the lead vehicle. The circles 1120 represent the path points of the follower vehicle. As illustrated, the path 1110 of the lead vehicle meanders along an S-shaped curve. At various locations along the S-shaped curve 1110, various turn circles 1130a and 1130b for the lead vehicle can be constructed. For example, at the location 1110a, the lead vehicle is turning toward the right. A turn circle 1130a whose center is to the right of the location 1110a can be constructed. At the location 1110b, the lead vehicle is turning toward the left. A turn circle 1130b whose center is to the left of the location 1110b can be constructed. The radius of the turn circle 1130a or 1130b depends on the curvature of the turn at the respective location.

As illustrated in FIG. 11, the path 1120 of the follower vehicle follows the path 1110 of the lead vehicle but with a cross track offset. The path points 1120 for the follower vehicle can be obtained by constructing various turn circles 1140a and 1140b based on the various turn circles 1130a and 1130b for the lead vehicle. For example, when the lead vehicle is at the location 1110a, a turn circle 1140a for the follower vehicle can be constructed to be concentric with the turn circle 1130a for the lead vehicle. The radius of the turn circle 1140a for the follower vehicle can be equal to the radius of the turn circle 1130a for the lead vehicle minus the desired cross track offset distance, so that the follower vehicle stays on the right side of the lead vehicle with the desired cross track offset distance. When the lead vehicle is at the location 1110b, a turn circle 1140b for the follower vehicle can be constructed to be concentric with the turn circle 1130b for the lead vehicle. The radius of the turn circle 1140b for the follower vehicle can be equal to the radius of the turn circle 1130b for the lead vehicle plus the desired cross track offset, so that the follower vehicle remains on the right side of the lead vehicle with the desired cross track offset distance.

To maintain a desired along track offset distance between a lead vehicle and a follower vehicle, the turn radius of the path of the follower vehicle can be adjusted based on the desired along track offset distance. The speed of the follower vehicle can be adjusted to maintain the desired along track offset distance and the desired cross track offset distance.

Figure 12A:
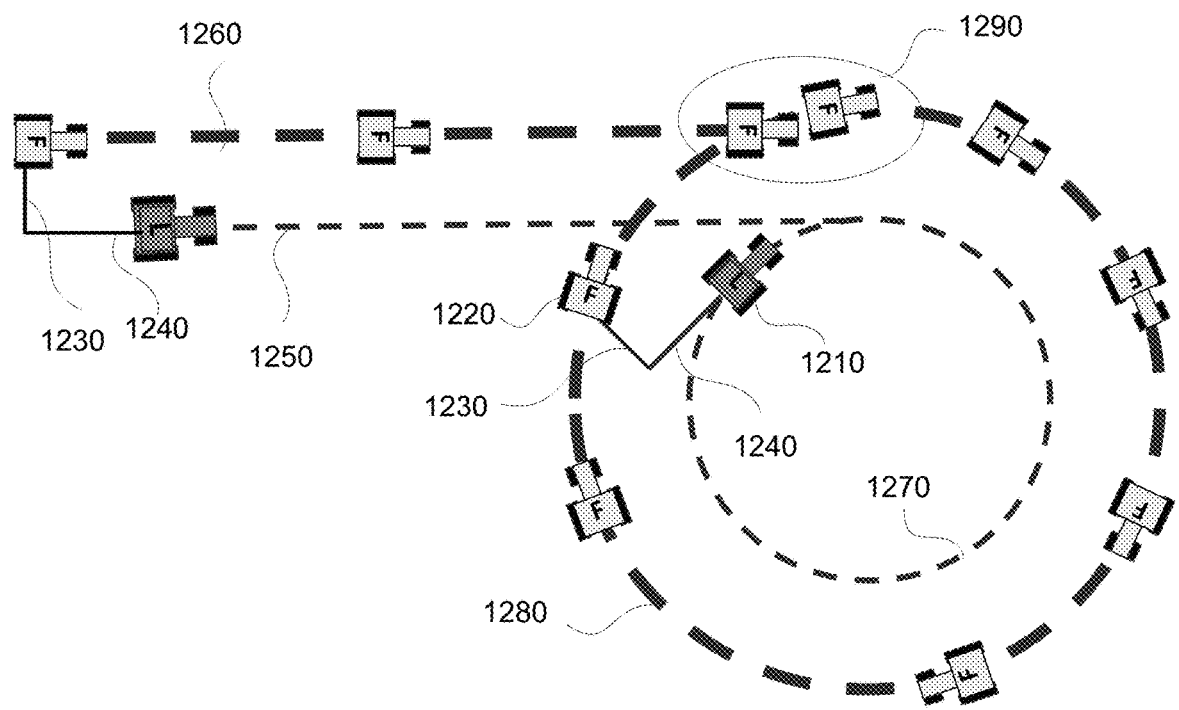
FIG. 12A shows a simulated path of a lead vehicle and a simulated path of a follower vehicle, with a desired cross track offset distance as well as a desired along track offset distance between a lead vehicle and a follower vehicle, according to some embodiments.

FIG. 12A shows a simulated path 1250 of a lead vehicle and a simulated path 1260 of a follower vehicle, with a desired cross track offset distance 1230 as well as a desired along track offset distance 1240 between a lead vehicle 1210 and a follower vehicle 1220, according to some embodiments. As illustrated, as the lead vehicle 1210 turns along a circle 1270, the follower vehicle 1220 turns along a concentric circle 1280 with a larger radius, while maintaining the desired cross track distance 1230 and the desired along track distance 1240 from the lead vehicle 1210 at all times. Note that, in order to maintain both the desired cross track offset distance 1230 and the desired along track offset distance 1240, the follower vehicle 1220 can have a non-intuitive outward movement when first acquiring a turn (e.g., near the location 1290 shown in FIG. 12A).

Figure 12B:
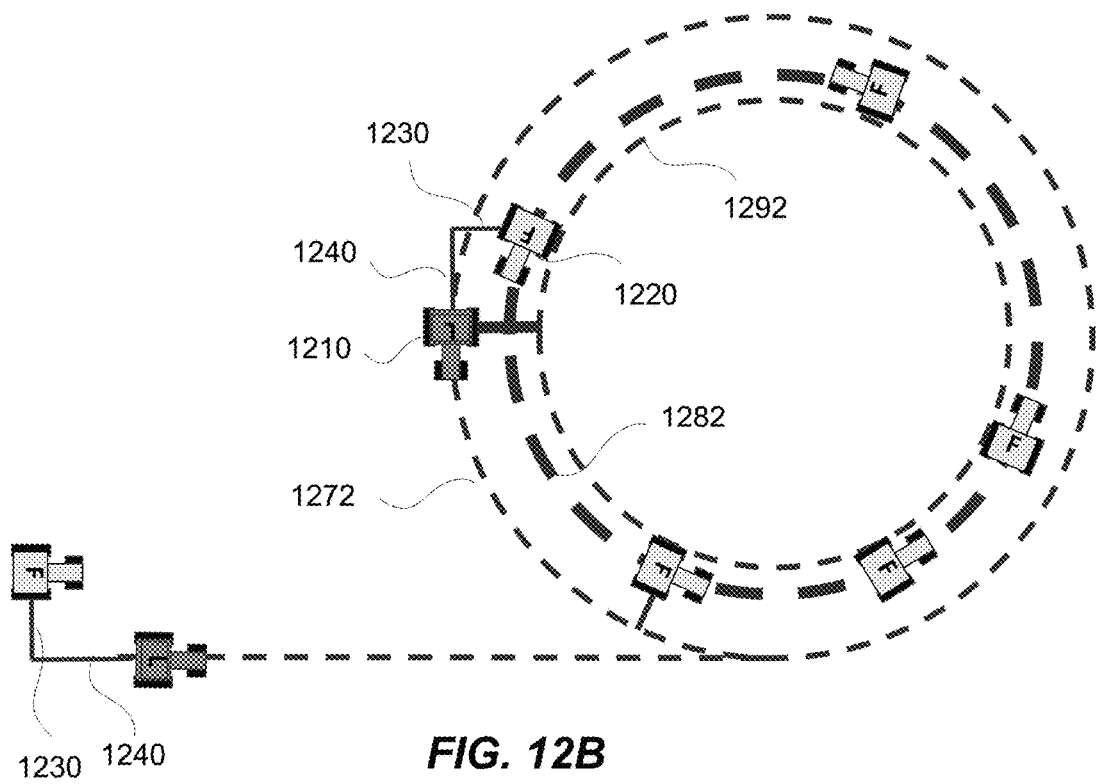
FIG. 12B illustrates another example of maintaining both a desired cross track offset distance and a desired along track offset distance between a lead vehicle and a follower vehicle during a turn according to some embodiments.

FIG. 12B illustrates another example of maintaining both a desired cross track offset distance 1230 and a desired along track offset distance 1240 between the lead vehicle 1210 and the follower vehicle 1220 during a turn according to some embodiments. Here, the turn circle 1282 of the follower vehicle 1220 has a radius that is less than the radius of the turn circle 1272 of the lead vehicle 1210. The circle 1292 represents a turn circle for the follower vehicle 1220 if there is only the desired cross track offset distance 1230 with no desired along track offset distance 1240. Thus, similar to the example illustrated in FIG. 12A, the desired along track offset distance 1230 affects the radius of the turn circle for the follower vehicle 1220.

Figure 13:
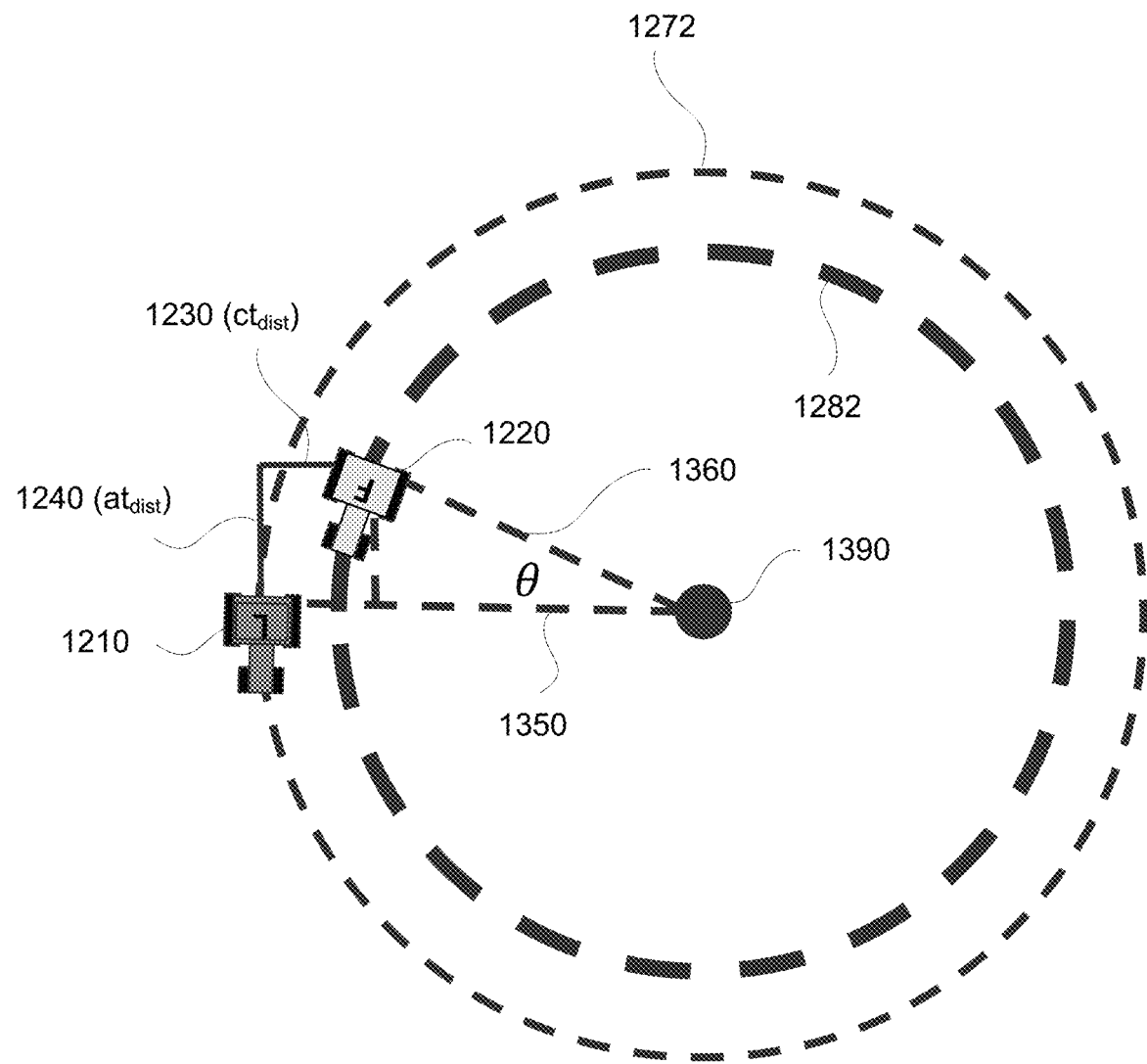
FIG. 13 illustrates how the radius of the turn circle for the follower vehicle in the example illustrated in FIG. 12B can be estimated according to some embodiments.

FIG. 13 illustrates how the radius of the turn circle 1282 for the follower vehicle 1220 in the example illustrated in FIG. 12B can be estimated according to some embodiments. At an instant of time, a first radial vector 1350 can be formed from the center 1390 of the turn circle 1272 or 1282 to the control point of the lead vehicle 1210; and a second radial vector 1360 can be formed from the center 1390 of the turn circle 1272 or 1282 to the control point of the follower vehicle 1220. If the radius of the turn circle 1272 for the lead vehicle 1210 is denoted as $R_1$, and the radius of the turn circle 1282 for the follower vehicle 1220 is denoted as $R_2$, the angle $\theta$ between the first radial vector 1350 and the second radial vector 1360 can be estimated as, $$\theta = \arctan\left(\frac{at_{dist}}{R_1 - ct_{dist}}\right), \quad (1)$$

where $at_{dist}$ and $ct_{dist}$ are the desired along track offset distance and the desired cross track offset distance, respectively. The radius $R_2$ of the follower vehicle 1220 can then be estimated as, $$R_2 = \frac{at_{dist}}{\sin\theta}. \quad (2)$$

Note that, if $at_{dist}=0$ (no desired along track offset), radius $R_2$ of the follower vehicle 1220 can then be estimated as, $$R_2 = R_1 + ct_{dist}. \quad (3)$$

It can be shown that, for the example illustrated in FIG. 12A, the angle $\theta$ between the first radial vector 1350 and the second radial vector 1360 can be estimated as, $$\theta = \arctan\left(\frac{at_{dist}}{R_1 + ct_{dist}}\right). \quad (3)$$

The radius $R_2$ of the follower vehicle 1220 can then be estimated using Equation (2). Note that, if $at_{dist}=0$ (no along track offset), radius $R_2$ of the follower vehicle 1220 can then be estimated as, $$R_2 = R_1 + ct_{dist}. \quad (5)$$

Thus, if the leading vehicle 1210 is turning toward the side of the follower vehicle 1220 (e.g., the follower vehicle 1220 is on the left side of the lead vehicle 1210, and the lead vehicle 1210 is turning toward the left, as illustrated in FIG. 12B), the radius $R_2$ of the follower vehicle 1220 can be estimated using Equations (1), (2), and (3). If the leading vehicle 1210 is turning away from the side of the follower vehicle 1220 (e.g., the follower vehicle 1220 is on the left side of the lead vehicle 1210, and the lead vehicle 1210 is turning toward the right, as illustrated in FIG. 12A), the radius $R_2$ of the follower vehicle 1220 can be estimated using Equations (4), (2), and (5).

Figure 14:
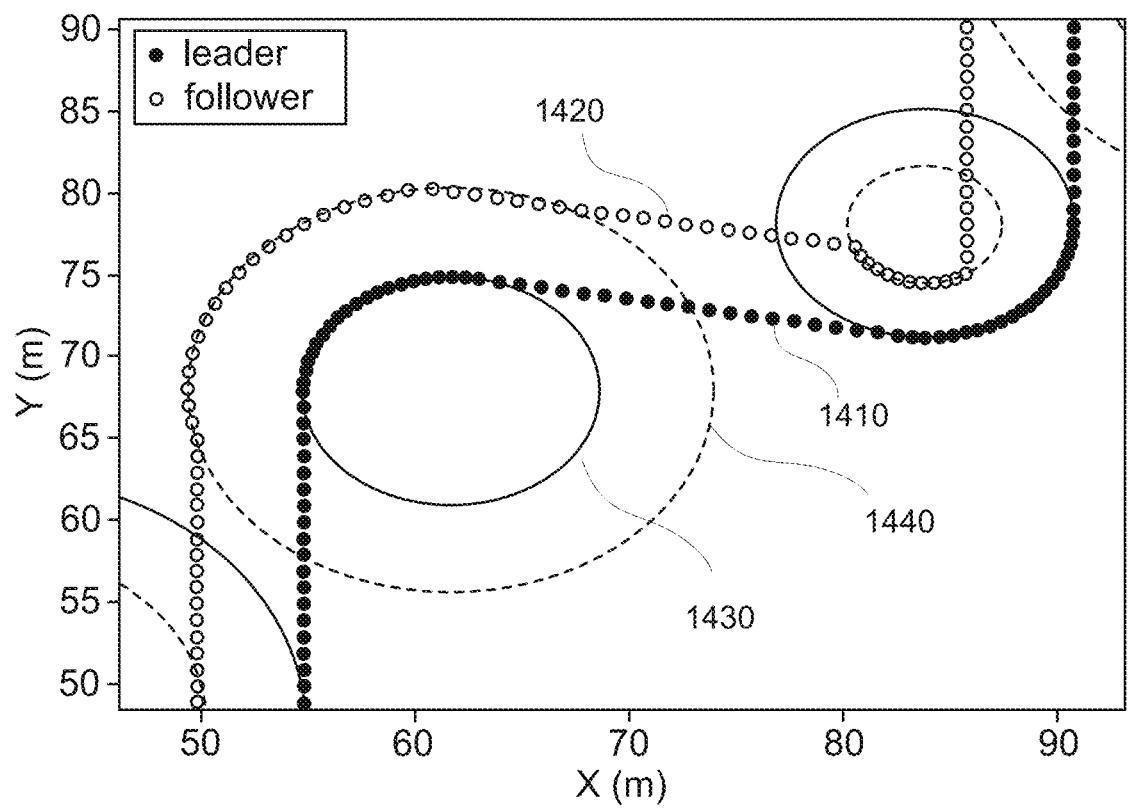
FIG. 14 shows a simulated path of a lead vehicle and a simulated path of a follower vehicle, with both a desired cross track offset distance and a desired along track offset distance between the lead vehicle and the follower vehicle, according to some embodiments.

FIG. 14 shows a simulated path 1410 of a lead vehicle and a simulated path 1420 of a follower vehicle, with both a desired cross track offset distance and a desired along track offset distance between the lead vehicle and the follower vehicle, according to some embodiments. As illustrated, various turn circles 1430 can be constructed along the path 1410 of the lead vehicle as the lead vehicle travels along an S-shaped curve. For each respective turn circle 1430 of the lead vehicle, a corresponding turn circle 1440 for the follower vehicle can be constructed to be concentric with the respective turn circle 1430, so that the path 1420 of the follower vehicle follows the path 1410 of the lead vehicle while maintaining the desired cross track offset distance and the desired along track offset distance.

Figure 15A:
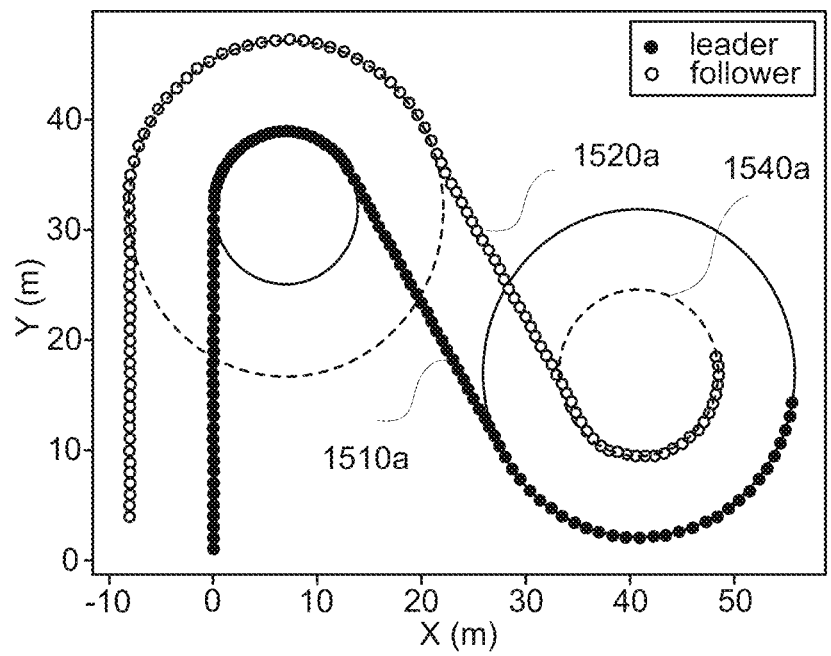
FIG. 15A shows a simulated path of a lead vehicle and a simulated path of a follower vehicle in a push mode according to some embodiments.
Figure 15B:
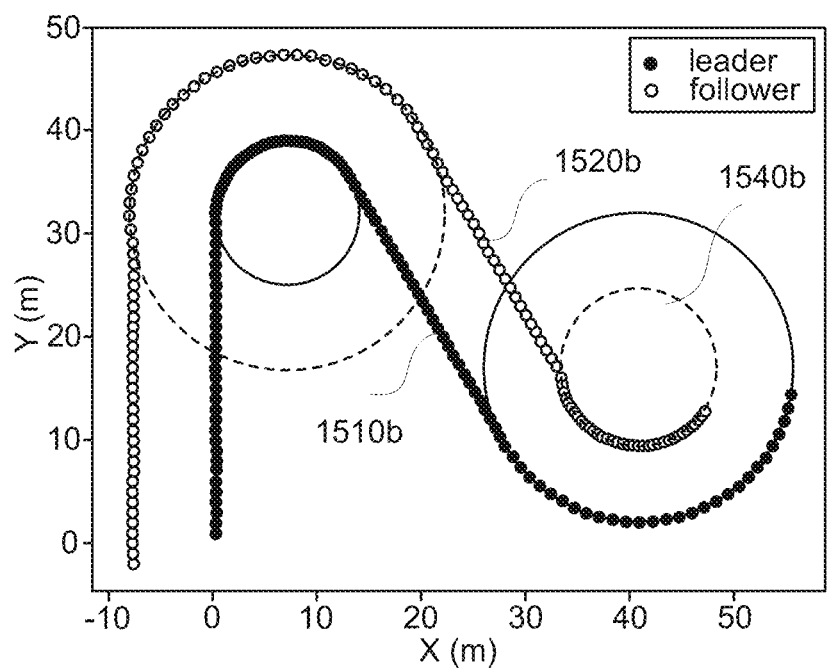
FIG. 15B shows a simulated path of a lead vehicle and a simulated path of a follower vehicle in a pull mode according to some embodiments.

According to some embodiments, the methods described above can be applied to both the push mode. FIG. 15A shows a simulated path 1510a of a lead vehicle and a simulated path 1520a of a follower vehicle in a push mode. FIG. 15B shows a simulated path 1510b of a lead vehicle and a simulated path 1520b of a follower vehicle in a pull mode. In either the push mode or the pull mode, the radii of the turn circles 1540a or 1540b for the follower vehicle are the same, but the speed control can be different, as discussed below.

Figure 16:
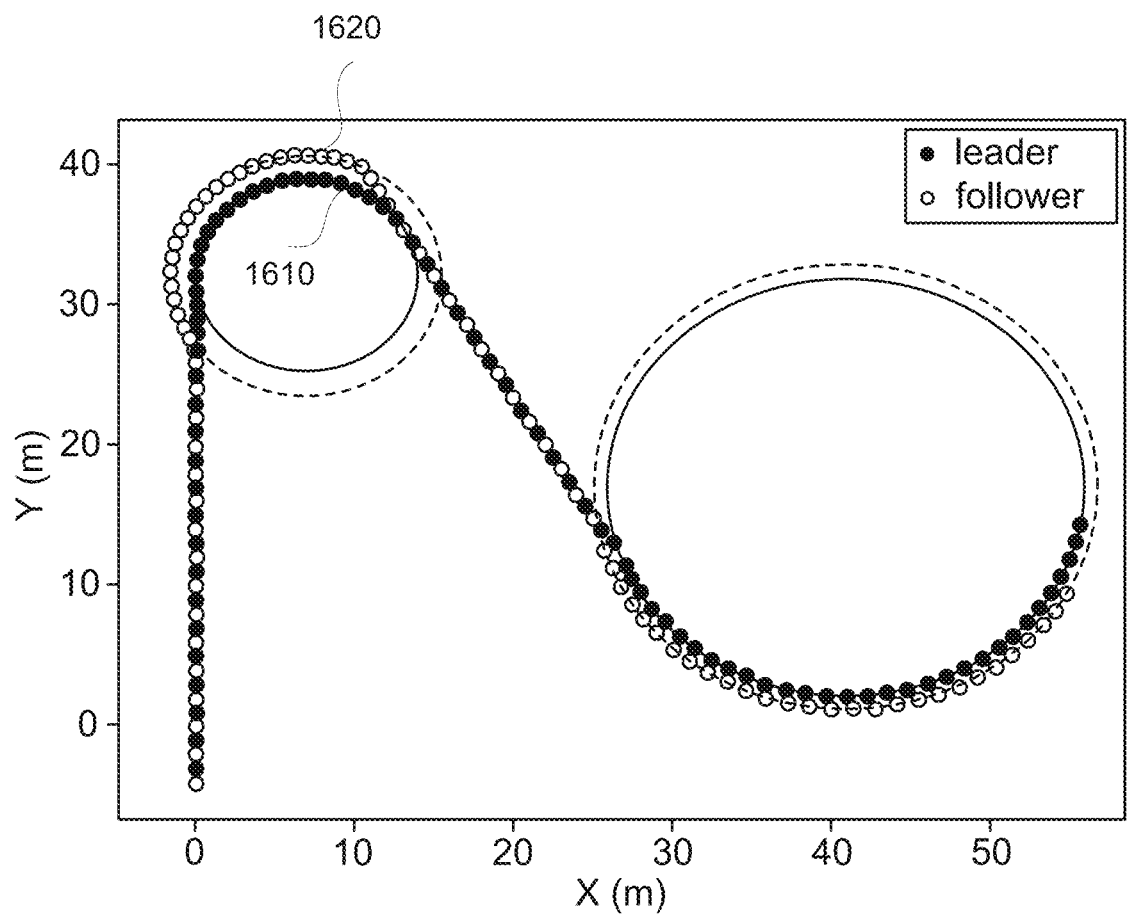
FIG. 16 shows a simulated path of a lead vehicle and a simulated path of a follower vehicle with only a desired along track offset distance and with no desired cross track offset distance, according to some embodiments.

The methods described above can also be applied to cases in which there is only a desired along track offset distance and with no desired cross track offset distance between the lead vehicle and the follower vehicle. FIG. 16 shows a simulated path 1610 of a lead vehicle and a simulated path 1620 of a follower vehicle with only a desired along track offset distance and with no desired cross track offset distance, according to some embodiments.

Figure 17A:
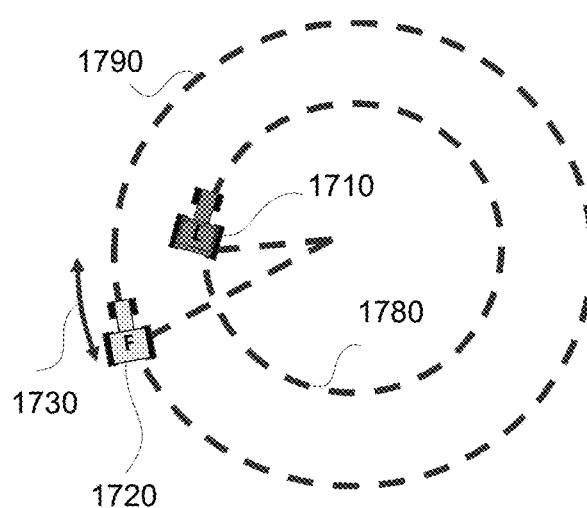
FIGS. 17A-17F illustrate speed control for a follower vehicle according to various embodiments.
Figure 17D:
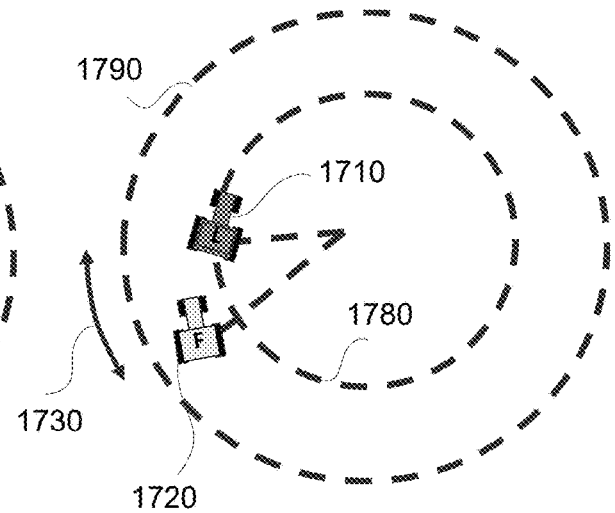

FIGS. 17A-17F illustrate speed control for a follower vehicle. According to some embodiments, the speed control for the follower vehicle 1720 can be based on an arc length error. Referring to FIG. 17A, a desired arc length between the lead vehicle 1710 and the follower vehicle 1720 can be calculated based on the desired cross track offset distance and the desired along track offset distance. If the actual arc length 1730 between the lead vehicle 1710 and the follower vehicle 1720 is less than the desired arc length, the system may decrease the speed of the follower vehicle 1720. Conversely, if the actual length 1730 between the lead vehicle 1710 and the follower vehicle 1720 is greater than the desired arc length, the system may increase the speed of the follower vehicle 1720.

Note that in a push mode, if the actual arc length 1730 between the lead vehicle 1710 and the follower vehicle 1720 is less than the desired arc length, the system may increase the speed of the follower vehicle 1720. Conversely, if the actual length 1730 between the lead vehicle 1710 and the follower vehicle 1720 is greater than the desired arc length, the system may decrease the speed of the follower vehicle 1720.

Figure 17B:
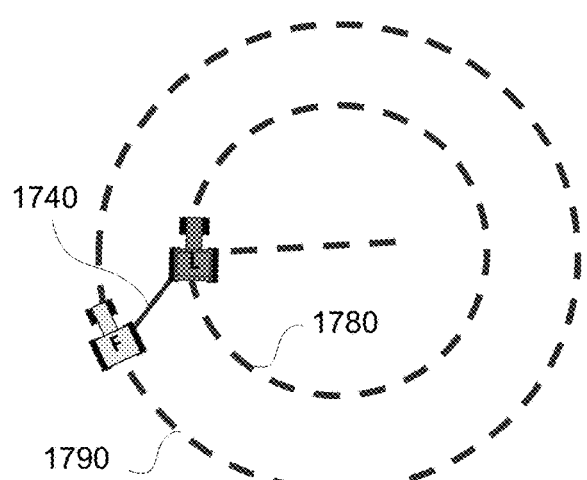

Referring to FIG. 17B, the speed control for the follower vehicle 1720 can also be based on a radial distance error. For example, if the actual radial distance 1740 between the lead vehicle 1710 and the follower vehicle 1720 is less than the desired radial distance, the system may decrease the speed of the follower vehicle 1720; conversely, if the actual radial distance 1740 between the lead vehicle 1710 and the follower vehicle 1720 is greater than the desired radial distance, the system may increase the speed of the follower vehicle 1720.

Figure 17E:
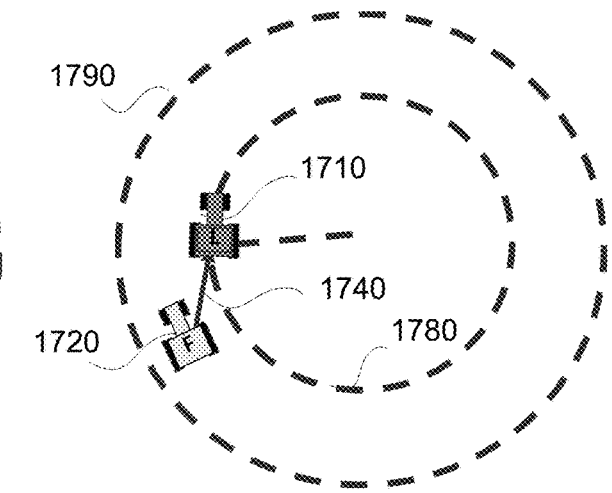
Figure 17C:
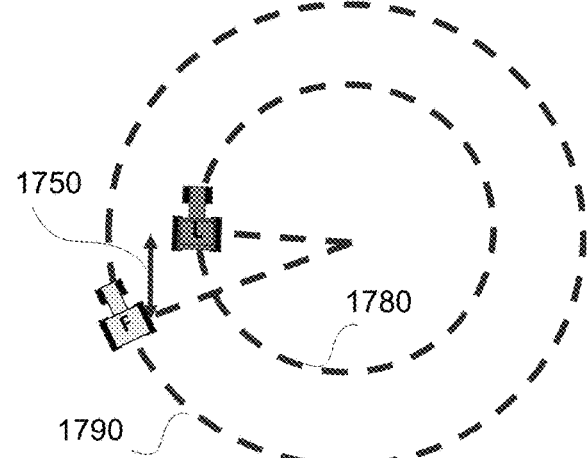

Referring to FIG. 17C, the speed control for the follower vehicle 1720 can also be based on an along track distance error. For example, if the actual along track distance 1750 between the lead vehicle 1710 and the follower vehicle 1720 is less than the desired along track distance, the system may decrease the speed of the follower vehicle 1720; conversely, if the actual along track distance 1750 between the lead vehicle 1710 and the follower vehicle 1720 is greater than the desired radial distance, the system may increase the speed of the follower vehicle 1720.

Figure 17F:
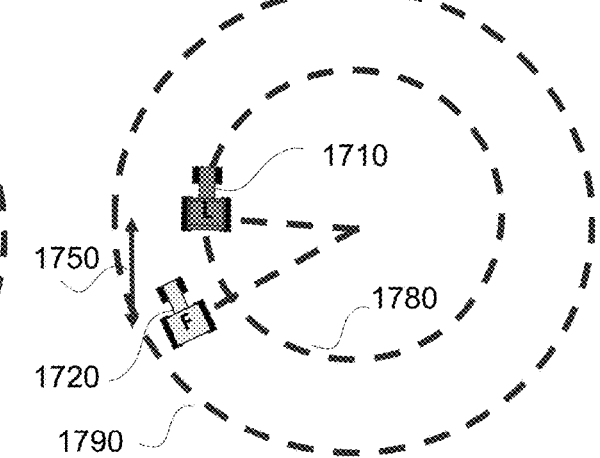

Speed control based on either radial distance error or on along track distance error may be able to maintain the correct distance, assuming that there is no cross track distance error, as illustrated in FIGS. 17B and 17C (e.g., the follower vehicle 1720 is on the desired turn circle 1790. However, if there is a cross track distance error (e.g., the follower vehicle 1720 is outside, or inside the desired turn circle 1790), speed control based on the radial distance error or based on the along track distance error may not be able to maintain the correct the distance, as illustrated in FIGS. 17E and 17F.

Consider the example illustrated in FIG. 17E, in which the follower vehicle 1720 is inside the desired turn circle 1790. If speed control is based on the radial distance error, the follower vehicle 1720 can be way behind the desired position, but still be at the desired radial distance 1740. Consider the example illustrated in FIG. 17F, in which the follower vehicle 1720 is also inside the desired turn circle 1790. If the speed control is based on the along track error, the follower vehicle 1720 can be close to the desired position, but may still not be quite right. In contrast, consider the example illustrated in FIG. 17D in which the follower vehicle 1720 is also inside the desired turn circle 1790, speed control based on the arc distance error may produce a better result.

According to some embodiments, the follower vehicle 1720 can have a different steady-state speed than that of the lead vehicle 1710. For example, if the radius of the turn circle 1790 for the follower vehicle 1720 is greater than the radius of the turn circle 1780 for the lead vehicle 1710, the steady-state speed of the follower vehicle 1720 can be greater than that of the lead vehicle 1710. Conversely, if the radius of the turn circle 1790 for the follower vehicle 1720 is less than the radius of the turn circle 1780 for the lead vehicle 1710, the steady-state speed of the follower vehicle 1720 can be less than that of the lead vehicle 1710.

Figure 18:
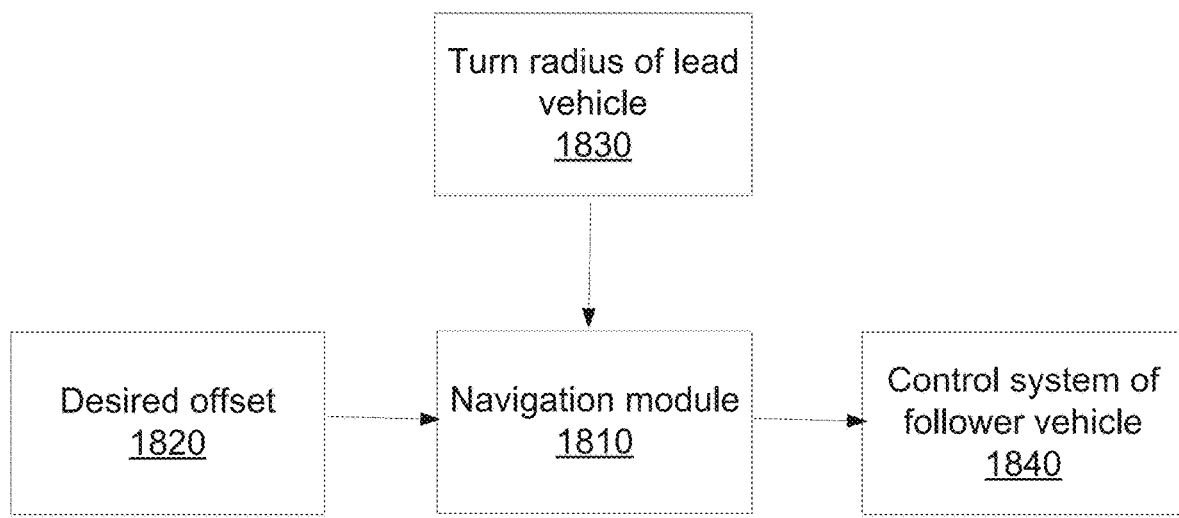
FIG. 18 is a simplified block diagram illustrating a method of maintaining offset in vehicle formation according to some embodiments.

FIG. 18 is a simplified block diagram illustrating a method of maintaining offset in vehicle formation according to some embodiments. At 1820, a desired offset 1820 can be input to a navigation module 1810. The desired offset 1820 can include a desired cross track offset distance and/or a desired along track offset distance. At 1830, the turn radius of the lead vehicle can be input to the navigation module.

The turn radius of the lead vehicle can be estimated from the yaw rate and the speed of the lead vehicle. In some embodiments, a low-pass filter can be applied to the estimated turn radius. The navigation module can determine a dynamic trajectory for the follower vehicle based on the desired offset and the turn radius of the lead vehicle. The dynamic trajectory can include, for example, a next position, a next heading and a next speed for the follower vehicle. At 1840, the dynamic trajectory can be output to a control system of the follower vehicle for navigation of the follower vehicle.

Figure 19:
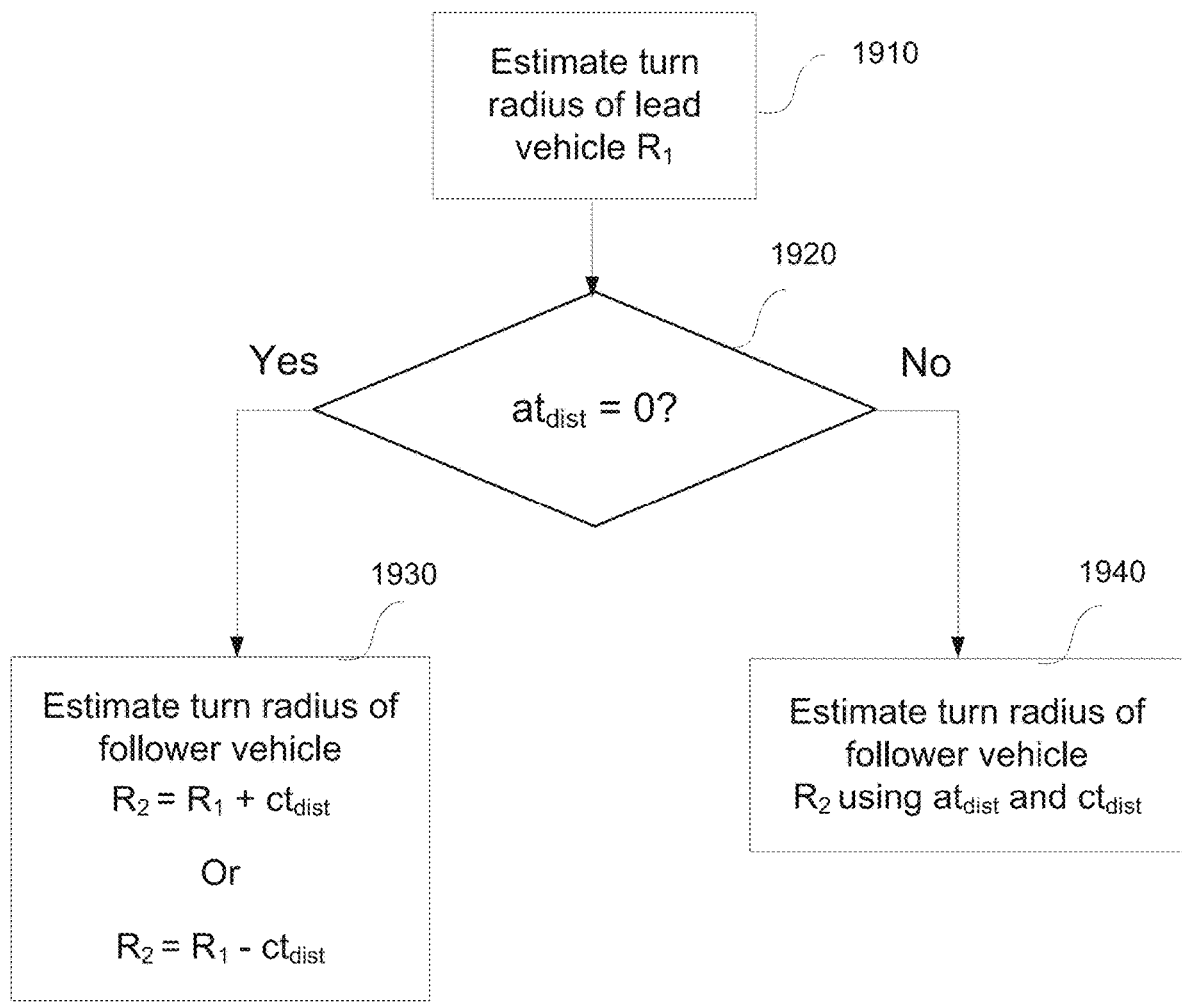
FIG. 19 shows a simplified flowchart illustrating a method of maintaining offset in vehicle formation according to some embodiments.

FIG. 19 shows a simplified flowchart illustrating a method of maintaining offset in vehicle formation according to some embodiments. At 1910, a current turn radius $R_1$ of the lead vehicle can be estimated. At 1920, the system can determine whether the desired along track offset distance is zero. At 1930, if the desired along track offset distance is zero, a turn radius of the follower vehicle can be estimated as $R_2=R_1+ct_{dist}$, or $R_2=R_1-c_{dist}$ (as shown in equations (3) and (5) above). At 1940, if the desired along track offset distance is not zero, a turn radius of the follower vehicle can be estimated using both the desired cross track offset distance $ct_{dist}$ and the desired along track offset distance Waist (e.g., using equations (1), (2), and (4)).

Figure 20:
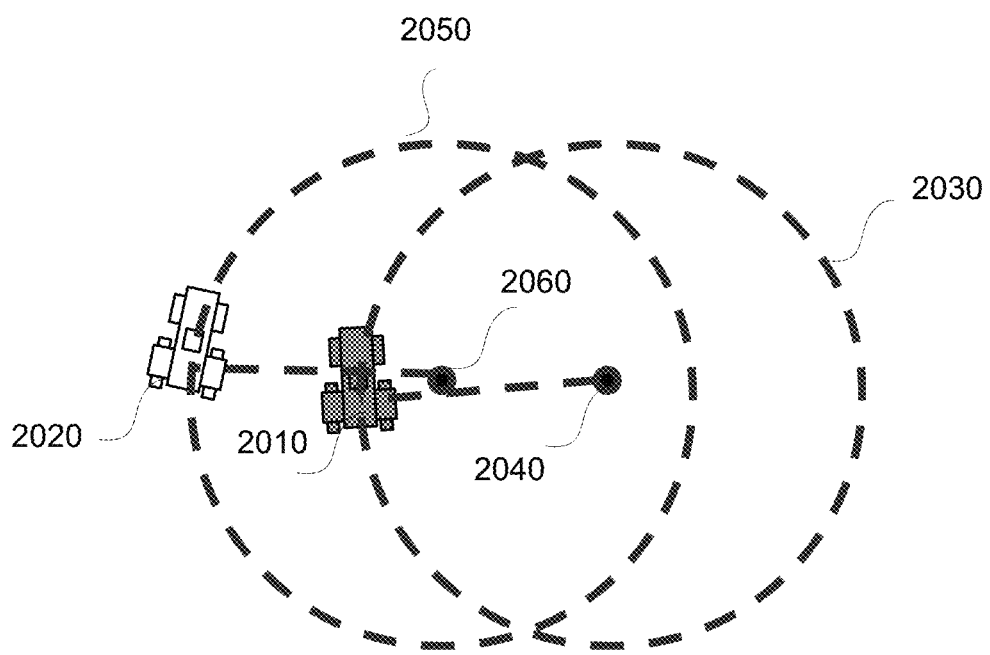
FIG. 20 illustrates a technique for maintaining offset during a turn according to some embodiments.

According to some embodiments, instead of using concentric circles, circles with offset centers can be used. FIG. 20 illustrates a technique for maintaining offset during a turn according to some embodiments. A first turn circle 2030 of a lead vehicle 2010 is centered at a first location 2040 and has a radius R. A second turn circle 2050 can be constructed for the follower vehicle 2020. The second turn circle 2050 has the same radius R as that of the first turn circle 2030, but the center of the second turn circle 2050 is shifted to a second location 2060, offset from the first location 2040. For example, the distance between the first location 2040 and the second location 2060 can be the desired cross track offset distance.

Figure 21:
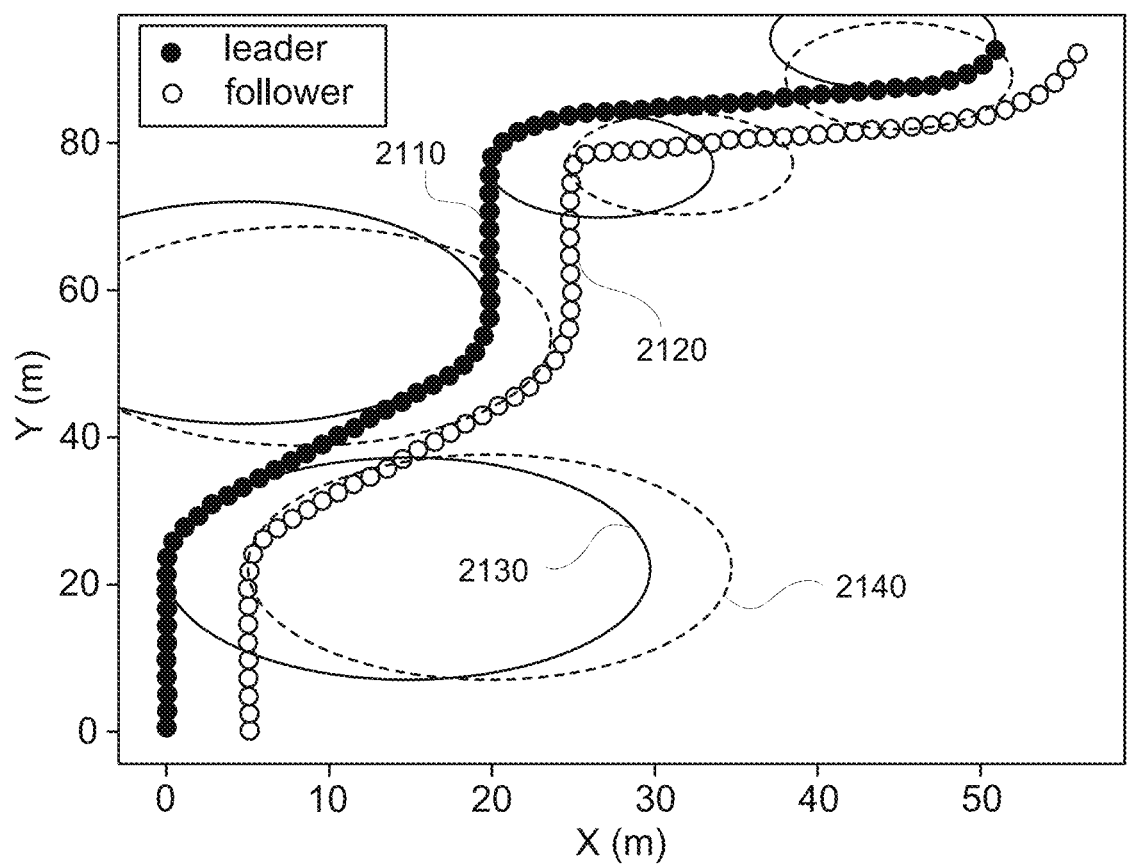
FIG. 21 shows a simulated path of a lead vehicle and a simulated path of a follower vehicle, with a desired cross track offset distance between the lead vehicle and the follower vehicle (with no desired along track offset distance), according to some embodiments.

FIG. 21 shows a simulated path 2110 of a lead vehicle and a simulated path 2120 of a follower vehicle, with a desired cross track offset distance between the lead vehicle and the follower vehicle (with no desired along track offset distance), according to some embodiments. As illustrated, various turn circles 2130 can be constructed along the path 2110 of the lead vehicle as the lead vehicle travels along an S-shaped curve. For each respective turn circle 2130 of the lead vehicle, a corresponding turn circle 2140 for the follower vehicle can be constructed for determining path points 2120 of the follower vehicle. The corresponding turn circle 2140 can have the same radius as that of the respective turn circle 2130, but its center is shifted with respect to the center of the respective turn circle 2130. As illustrated, the path 2120 of the follower vehicle can follow the path 2110 of the lead vehicle while maintaining the desired cross track offset distance.

Figure 22:
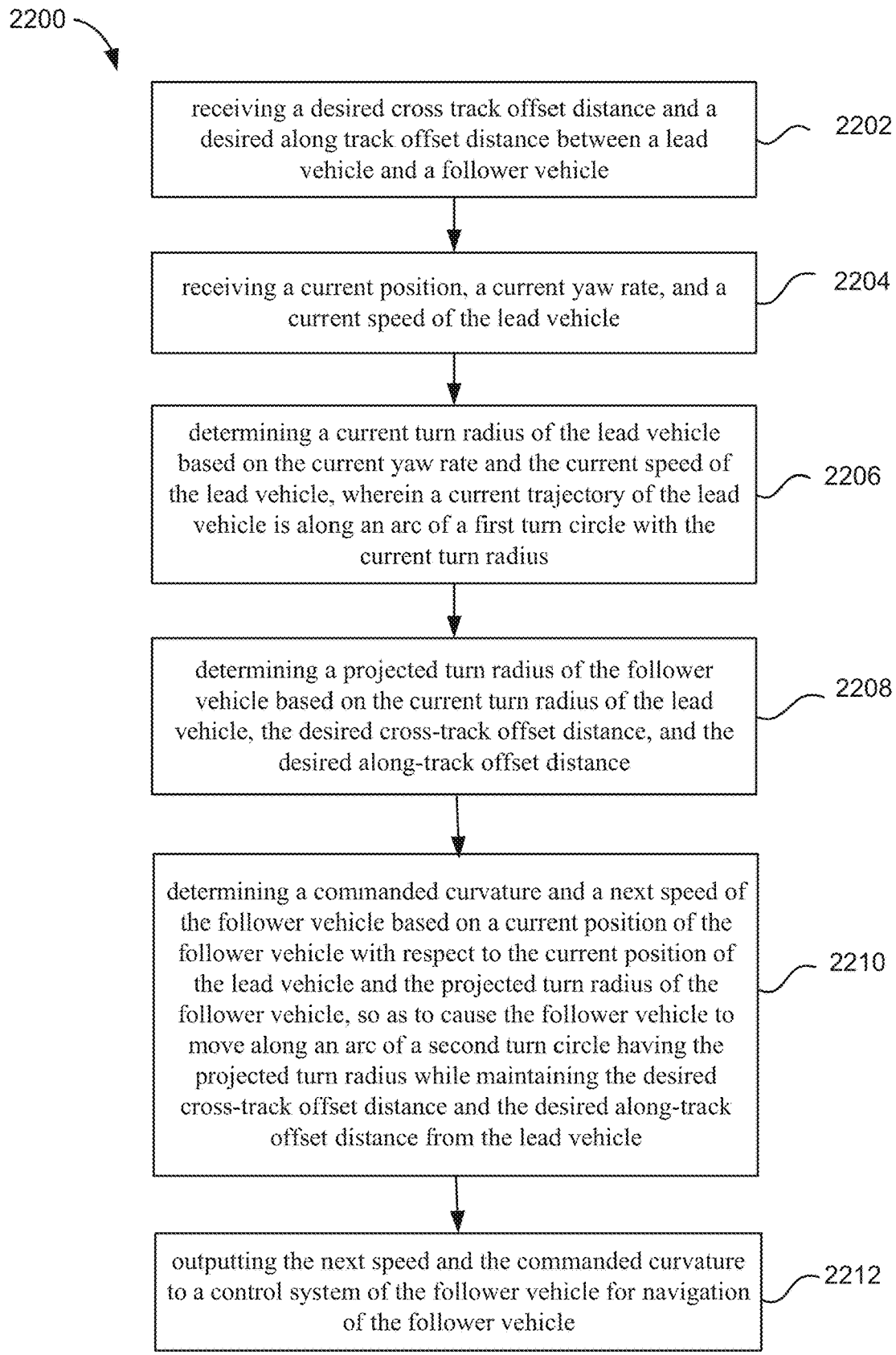
FIG. 22 is a simplified flowchart illustrating a method of maintaining vehicle formation according to some embodiments.

FIG. 22 is a simplified flowchart illustrating a method 2200 of maintaining vehicle formation according to some embodiments.

The method 2200 includes, at 2202, receiving a desired cross track offset distance and a desired along track offset distance between a lead vehicle and a follower vehicle; and at 2204, receiving a current position, a current yaw rate, and a current speed of the lead vehicle.

The method 2200 further includes, at 2206, determining a current turn radius of the lead vehicle based on the current yaw rate and the current speed of the lead vehicle. A current trajectory of the lead vehicle is along an arc of a first turn circle with the current turn radius.

The method 2200 further includes, at 2208, determining a projected turn radius of the follower vehicle based on the current turn radius of the lead vehicle, the desired cross track offset distance, and the desired along track offset distance.

The method 2200 further includes, at 2210, determining a commanded curvature and a next speed of the follower vehicle based on a current position of the follower vehicle with respect to the current position of the lead vehicle and the projected turn radius of the follower vehicle, so as to cause the follower vehicle to move along an arc of a second turn circle having the projected turn radius while maintaining the desired cross track offset distance and the desired along track offset distance from the lead vehicle.

The method 2200 further includes, at 2212, outputting the next speed and the commanded curvature to a control system of the follower vehicle for navigation of the follower vehicle.

It should be appreciated that the specific steps illustrated in FIG. 22 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 22 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 23:
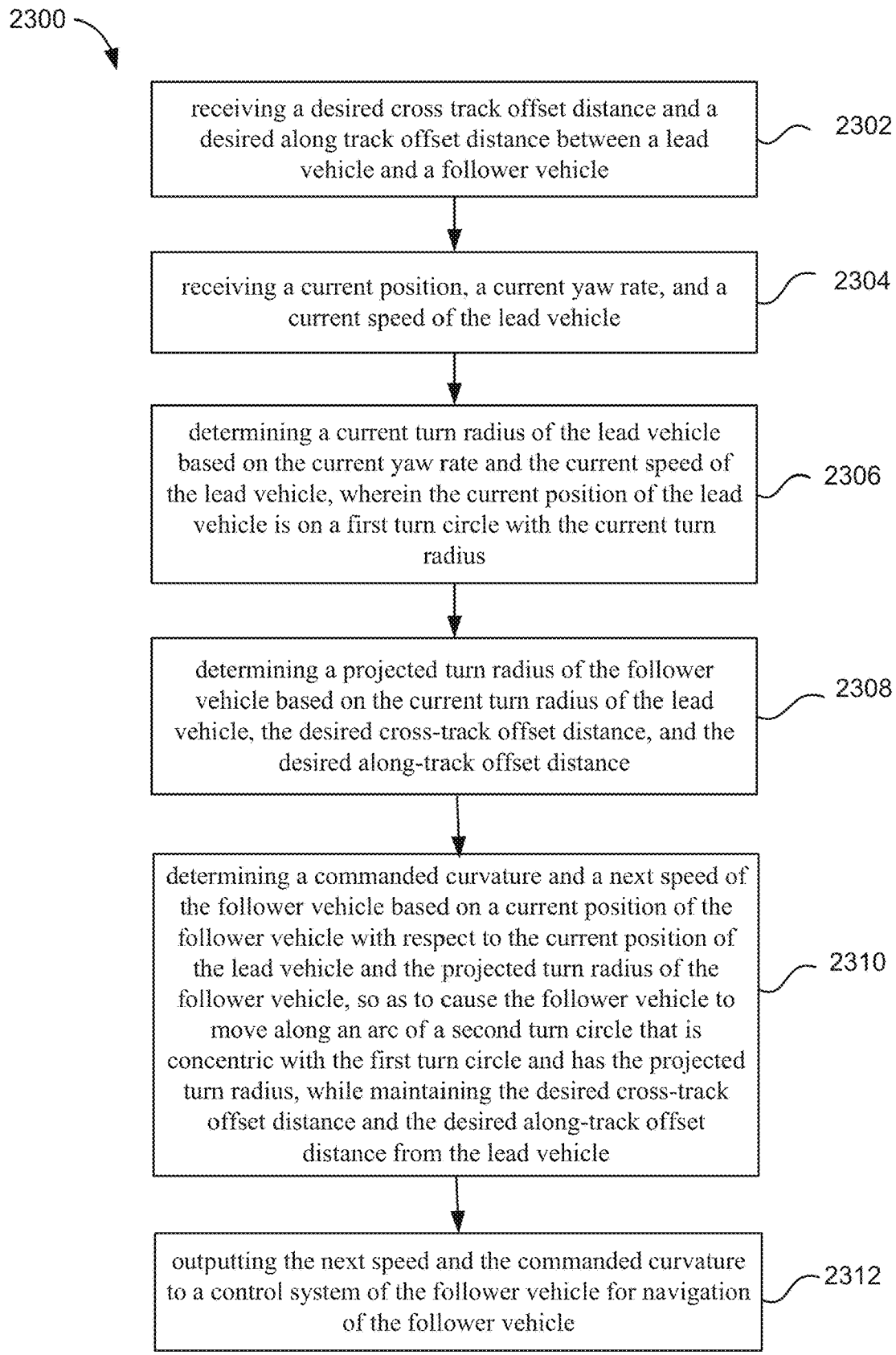
FIG. 23 is a simplified flowchart illustrating a method of maintaining vehicle formation according to some embodiments.

FIG. 23 is a simplified flowchart illustrating a method 2300 of maintaining vehicle formation according to some embodiments.

The method 2300 includes, at 2302, receiving a desired cross track offset distance and a desired along track offset distance between a lead vehicle and a follower vehicle; and at 2304, receiving a current position, a current yaw rate, and a current speed of the lead vehicle.

The method 2300 further includes, at 2306, determining a current turn radius of the lead vehicle based on the current yaw rate and the current speed of the lead vehicle. The current position of the lead vehicle is on a first turn circle with the current turn radius.

The method 2300 further includes, at 2308, determining a projected turn radius of the follower vehicle based on the current turn radius of the lead vehicle, the desired cross track offset distance, and the desired along track offset distance.

The method 2300 further includes, at 2310, determining a commanded curvature and a next speed of the follower vehicle based on a current position of the follower vehicle with respect to the current position of the lead vehicle and the projected turn radius of the follower vehicle, so as to cause the follower vehicle to move along an arc of a second turn circle that is concentric with the first turn circle and has the projected turn radius, while maintaining the desired cross track offset distance and the desired along track offset distance from the lead vehicle.

The method 2300 further includes, at 2312, outputting the next speed and the commanded curvature to a control system of the follower vehicle for navigation of the follower vehicle.

It should be appreciated that the specific steps illustrated in FIG. 23 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 23 may include multiple sub-steps that may be performed in various sequences as appropriate to the individual step. Furthermore, additional steps may be added or removed depending on the particular applications. One of ordinary skill in the art would recognize many variations, modifications, and alternatives.

C. Path Following

In "follow me" type of vehicle formation, a follower vehicle can follow a lead vehicle with a desired along track offset distance. For some applications, it can be important for the follower vehicle to not only maintain a distance from the lead vehicle, but also follow the exact same path that the lead vehicle has traversed. This type of vehicle formation may be referred to as "path following" formation.

Figure 24A:
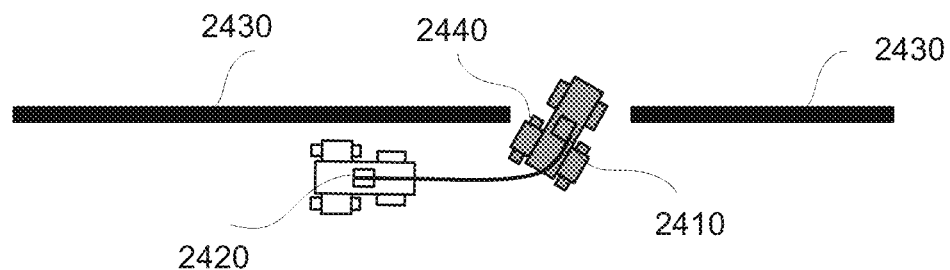
FIGS. 24A-24D illustrate an example in which it can be important for a follower vehicle to follow the exact same path as a lead vehicle.
Figure 24B:
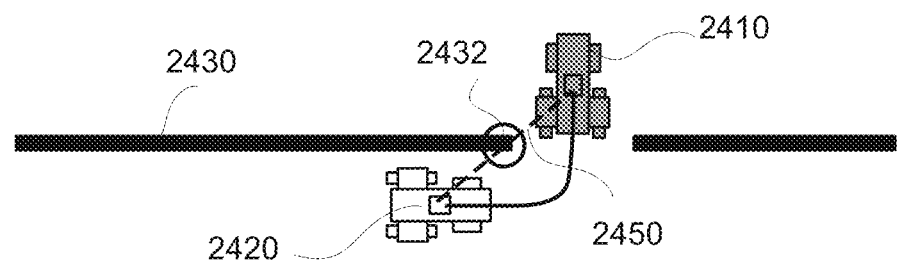
Figure 24C:
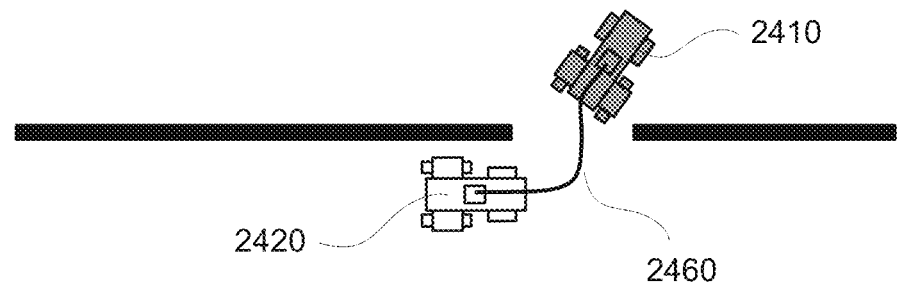
Figure 24D:

FIGS. 24A-24D illustrate an example in which it can be important for a follower vehicle to follow the exact same path as a lead vehicle. Referring to FIG. 24A, a lead vehicle 2410 is slowly going through a narrow opening 2440 in a fence 2430. Referring to FIG. 24B, if a follower vehicle 2420 follows the lead vehicle 2410 by maintaining only a radial distance (represented by the dashed line 2450) from the lead vehicle 2410, it is possible that a collision between the follower vehicle 2420 and the fence 2430 can occur (e.g., in the region 2430). Referring to FIGS. 24C and 24D, if the follower vehicle 2420 follows the exact path 2460 of the lead vehicle 2410, such collision can possibly be avoided. Similar situations can arise, for example, when crossing a narrow bridge.

In some situations, it can also be important for the follower vehicle to not only follow the exact path, but also at the same recorded speed of the lead vehicle. For instance, in the fence example illustrated in FIGS. 24A-24D, assume that, as the lead vehicle slowly goes through the narrow opening 2440 in the fence 2430, a person walks in front of the follower vehicle 2420. The follower vehicle stops and waits for the person to move out of the way. The follower vehicle 2420 may then want to speed up to maintain the desired along track distance. It is possible that the follower vehicle 2420 can go at a fast speed that is not safe for navigating through the narrow opening 2440 in the fence 2430. If the follower vehicle 2420 follows the lead vehicle 2410 at the same recorded speed of the lead vehicle, this problem can possibly be avoided.

According to some embodiments, a follower vehicle would take the exact path of a lead vehicle, matching both position and heading of the lead vehicle. In some embodiments, the follower vehicle can also match the recorded speed of the lead vehicle. The lead vehicle can drop waypoints at regular intervals along its path. Each waypoint includes a respective position, a respective heading, and a respective speed of the lead vehicle. The follower vehicle can visit each waypoint while keeping a desired along path distance. According to some embodiments, the position of the lead vehicle can be obtained from sensors such as global navigation satellite systems (GNSS) receivers. The heading of the lead vehicle can be obtained from multiple GNSS receivers (e.g., two GNSS receivers mounted on the lead vehicle so that they are laterally displaced from each other), or from inertial navigation system (INS) sensors. Waypoints can be dropped in various ways. For example, the frequency of waypoints dropping can be proportional to distance, time, heading degree, and/or speed.

Figure 25A:
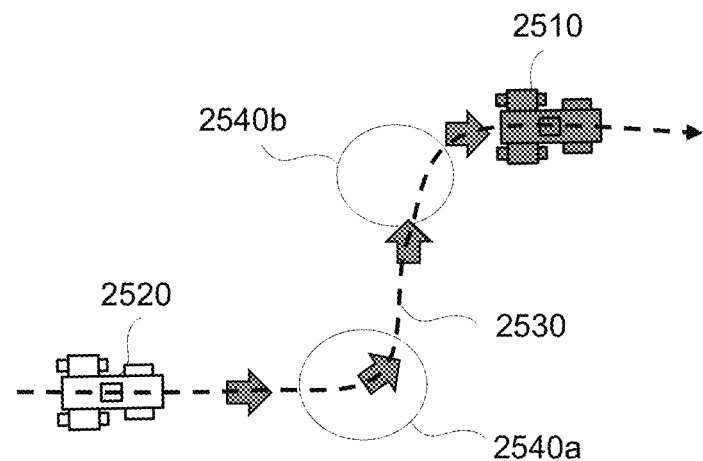
FIGS. 25A and 25B illustrate some exemplary ways waypoints can be dropped according to various embodiments.
Figure 25B:
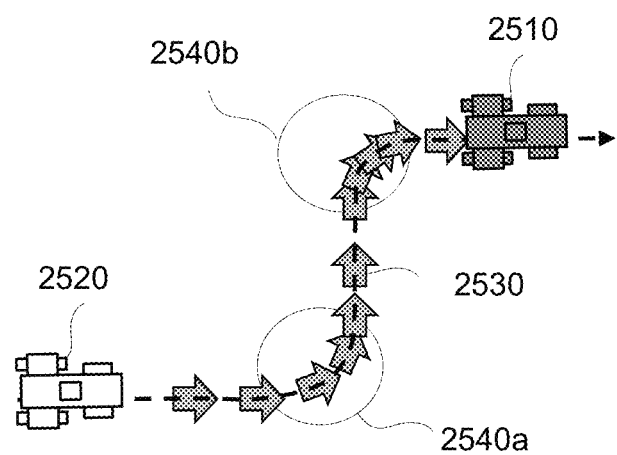

FIGS. 25A and 25B illustrate some exemplary ways waypoints can be dropped according to various embodiments. Referring to FIG. 25A, the lead vehicle 2510 can drop waypoints 2530 at evenly spaced distance intervals along its path for the follower vehicle 2520 to visit. According to this method, it is possible that the waypoints 2530 may lose some fidelity to the exact path in those sections of tight turns. For example, in those sections 2540a and 2540b during which the lead vehicle 2510 makes sharp turns, the spatial density of the waypoints 2530 in those areas can be too sparse to represent the exact path.

Referring to FIG. 25B, the lead vehicle 2510 can drop waypoints 2530 based on time and change in heading. For example, a counter can be incremented with time and rate of change in heading. If there is no change in heading (e.g., the lead vehicle 2510 is not turning), waypoints 2530 can be dropped at evenly spaced time intervals (e.g., at a base time interval). When there is a change in heading, the time interval between consecutive waypoints 2530 can be shortened based on the rate of change in heading. In this manner, the spatial density of the waypoints 2530 can be higher in the turn sections 2540a and 2540b than in the straight sections. Thus, the waypoints 2530 may represent the exact path of the lead vehicle 2510 with high fidelity even in tight turns.

Figure 26:
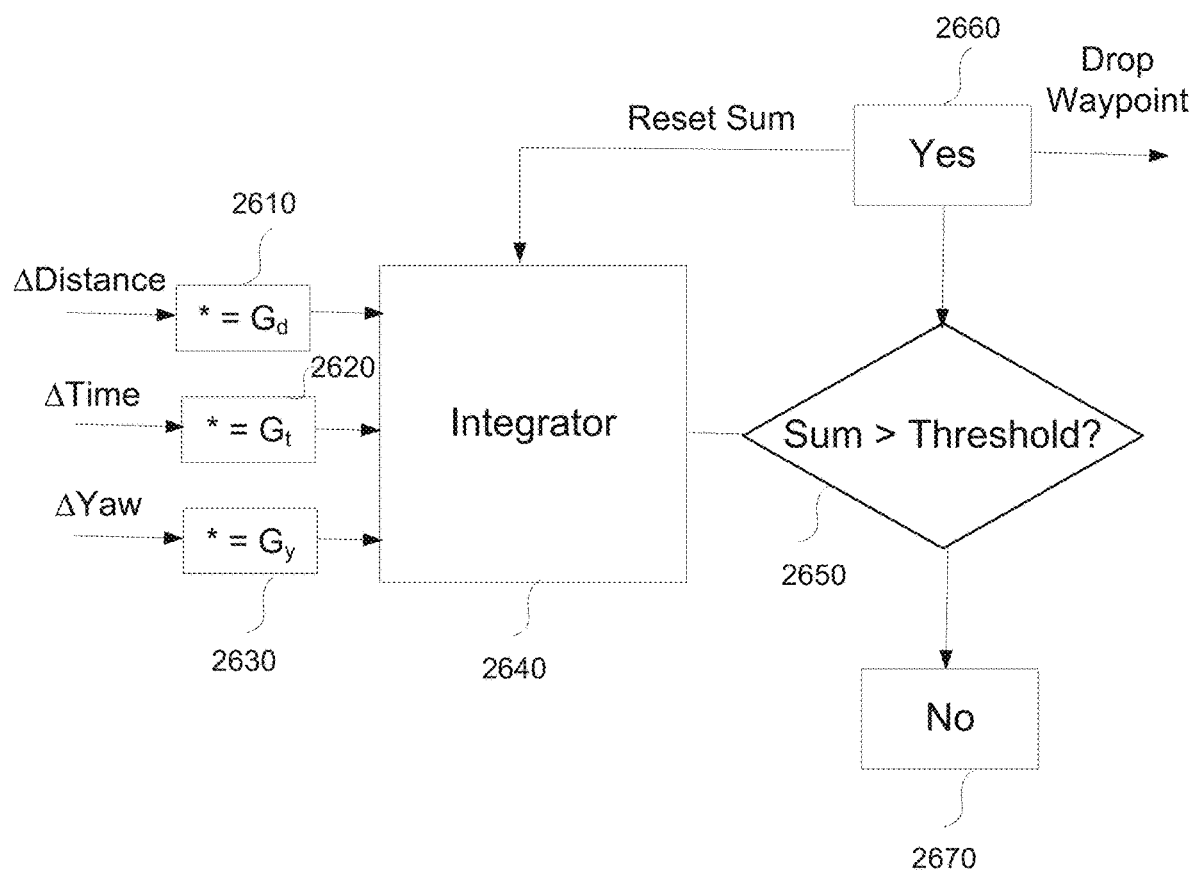
FIG. 26 is a simplified flowchart illustrating a method of dropping waypoints according to some embodiments.

FIG. 26 is a simplified flowchart illustrating a method of dropping waypoints according to some embodiments. The frequency of dropping waypoints can be proportional to metrics such as distance, time, and yaw change (e.g., heading change). At 2610, a distance ΔDistance from the last waypoint can be multiplied by a gain $G_d$. At 2620, a time Δt elapsed from the last waypoint can be multiplied by a gain $G_t$. At 2630, a yaw change ΔYaw from the last waypoint can be multiplied by a gain $G_y$. The scaled metrics of distance, time, and yaw change can be input to the integrator 2640, which can estimate a sum of the scaled metrics. At 2650, the sum of the scaled metrics is compared to a threshold (e.g., a pre-determined threshold). At 2660, if the sum is greater than the threshold, a waypoint is dropped, and the integrator is reset to zero. At 2670, if the sum is not greater than the threshold, the counting continues. According to some embodiments, the values of the gains, $G_d$, $G_t$, and $G_y$, can be dynamically adjustable.

Figures 27A, 27B:
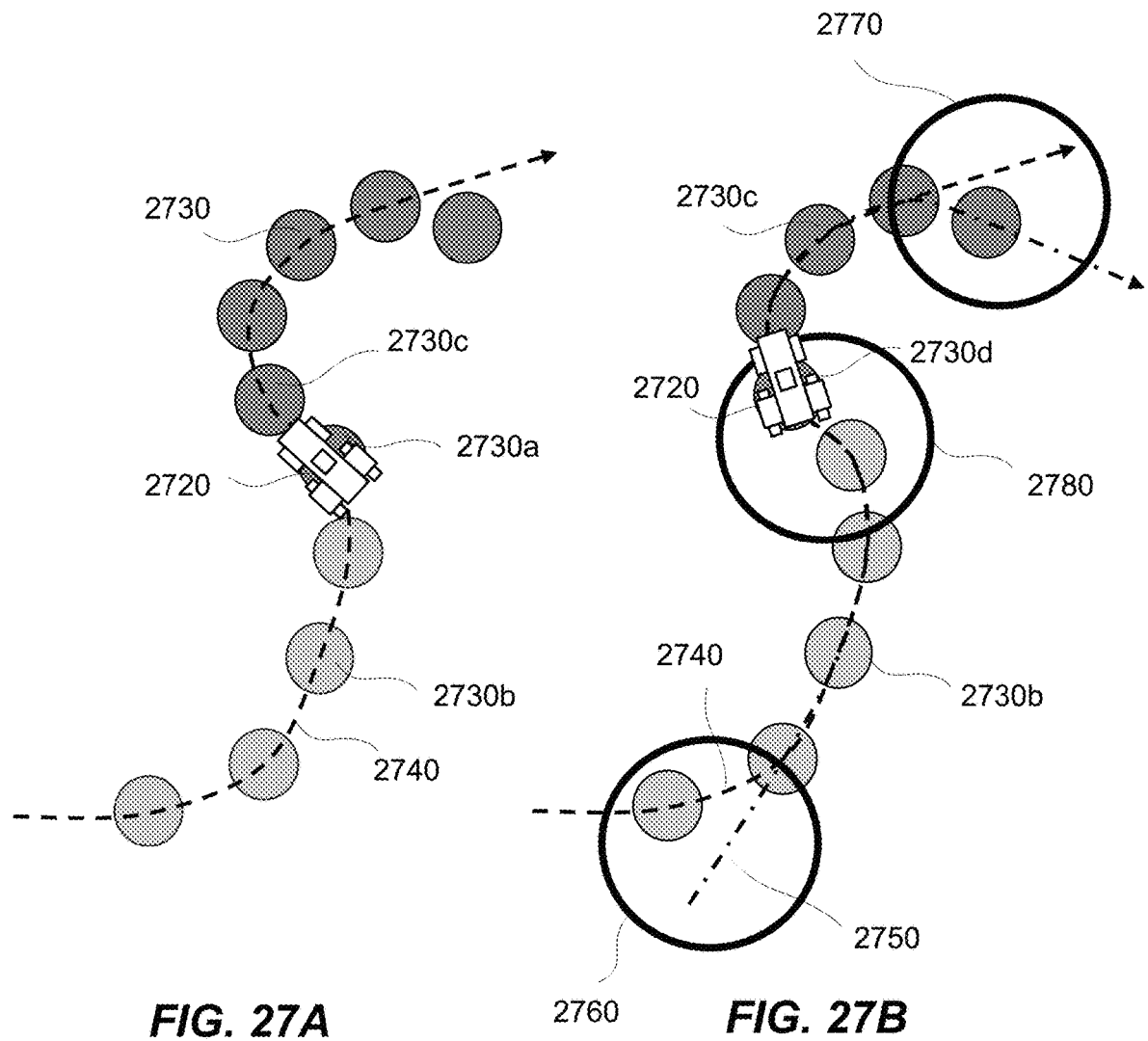
FIGS. 27A and 27B illustrate a method of spline fitting according to some embodiments.

A path for a follower vehicle can be determined by spline fitting the waypoints dynamically. FIGS. 27A and 27B illustrate a method of spline fitting according to some embodiments. Referring to FIG. 27A, the follower vehicle 2720 is currently at the waypoint 2730a. A spline trajectory 2740 can be fitted to a plurality of waypoints 2730. It can be advantageous to use equal numbers of waypoints 2730 that are in front of and behind the current waypoint 2730a. For instance, in the example illustrated in FIG. 27A, a set of four waypoints 2730c (dark circles) in front of the current waypoint 2730a, and a set of four waypoints 2730b (light circles) behind the current waypoint 2730a can be used to fit a spline trajectory 2740. The waypoints 2730c in front of the current waypoint 2730a are those waypoints that have not been visited by the follower vehicle 2720 yet; and the waypoints 2730b behind the current waypoint 2730a are those waypoints that have already been visited by the follower vehicle 2720.

Referring to FIG. 27B, as the follower vehicle 2720 reaches the next waypoint 2730d, the spline trajectory is recalculated using another set of four waypoints 2730c in front of the current waypoint 2730d, and another set of four waypoints 2730b behind the current waypoint 2730d. As illustrated in FIG. 27B, the middle section (e.g., adjacent the region 2780) of the new spline trajectory 2750 (dot-dash line) does not change much with respect to that of the previous spline trajectory 2740 (dashed line), but the edges of the new spline trajectory 2750 (e.g., in the regions 2760 and 2770) change significantly. Therefore, it can be advantageous to use equal numbers of waypoints 2730 in front of and behind the current waypoint to dynamically fit a spline trajectory for the follower vehicle 2720 to follow.

According to some embodiments, before engaging path following, a system can ensure that certain initial conditions are met. FIGS. 28A-28D illustrate some exemplary initial conditions. Referring to FIG. 28A, a sector 2830 of a circle can be defined behind a lead vehicle 2810. The sector 2830 can have a predetermined central angle 2840. For example, the central angle 2840 can be 30 degrees (or some other predetermined angle). The system can require that a follower vehicle 2820 is within the 30-degree sector 2830. If the follower vehicle 2820 is outside the 30-degree sector 2830 as illustrated in FIG. 28A, the system may not engage path following.

Referring to FIG. 28B, the sector 2830 can have a radius that is equal to predetermined maximum radial distance $RD_{max}$. The system can require that the follower vehicle 2820 is within the maximum radial distance $RD_{max}$ from the lead vehicle 2810. Thus, if the follower vehicle 2820a is outside the sector 2830 in the radial direction, the system may not engage path following. The system can also require that the follower vehicle 2820 is outside a minimum radial distance $RD_{min}$ from the lead vehicle 2810. Thus, if the follower vehicle 2820b is within the sector with a radius $RD_{min}$, the system may not engage path following.

Referring to FIG. 28C, the system can require that the heading of the follower vehicle 2820 is within a predetermined angle with respect to the heading of the lead vehicle 2810. For example, if the angle 2860 between the heading of the lead vehicle 2810 and the heading of the follower vehicle 2820 is greater than 30 degrees (or some other predetermined angle), the system may not engage path following.

FIG. 28D illustrate a situation in which all the initial conditions are met. For example, the follower vehicle 2820 is within the 30-degree sector 2830, is within the maximum radial distance $RD_{max}$ and outside the minimum radial distance $RD_{min}$, and the heading of the follower vehicle 2820 is within 30 degrees with respect to the heading of the lead vehicle 2810. When all the initial conditions are met, the system may engage path following. It should be understood that, according to various embodiments, the system may not require that all of the above exemplary initial conditions be met, or can require additional initial conditions be met.

In some embodiments, the system may limit the speed of the follower vehicle in order to be able to follow the dynamic path. If the follower vehicle is unable to follow the path even with the reduced speed (e.g., when the leader vehicle makes a turn that has a radius which is too small), the system may disengage path following.

According to some embodiments, the follower vehicle not only follows the exact path of the lead vehicle, but also at the recorded speed of the lead vehicle along the path. Each waypoint dropped by the lead vehicle can include a speed tag that indicates the speed of the lead vehicle at that waypoint (which may be referred to as "waypoint speed"). The speed control of the follower vehicle can be based on the waypoint speed at the current waypoint, an along path error of the follower vehicle, and the current instantaneous speed of the lead vehicle. The along path distance for each point along the spline path that fits the unvisited waypoints can be calculated. The current along path distance of the follower vehicle can be compared to the desired along path distance to determine an along path error.

Figure 29:
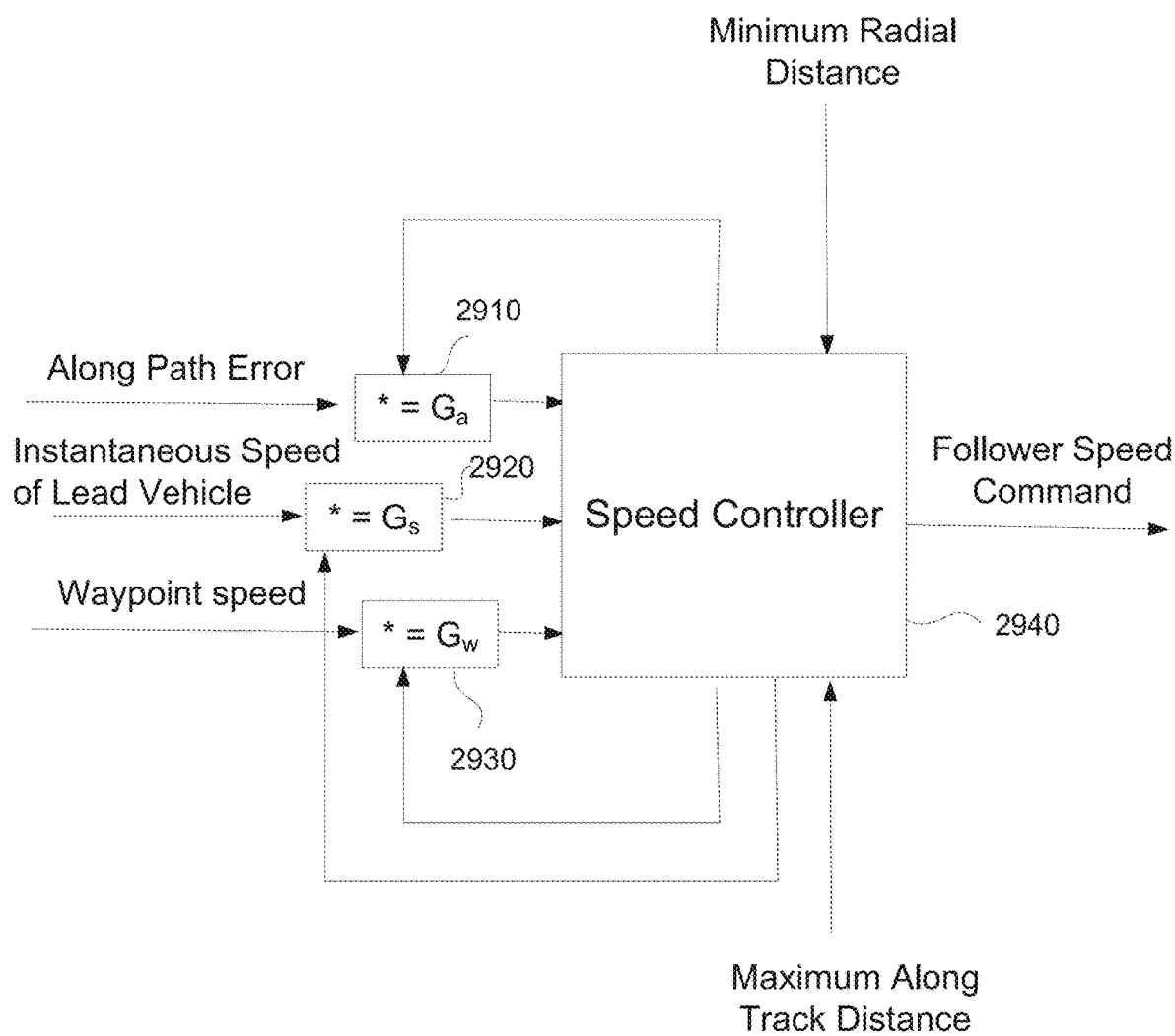
FIG. 29 is a simplified flowchart illustrating a method of speed control for path following according to some embodiments.

FIG. 29 is a simplified flowchart illustrating a method of speed control for path following according to some embodiments. At 2910, the along path error can be multiplied by a gain $G_a$. At 2920, the current instantaneous speed of the lead vehicle can be multiplied by a gain $G_s$. At 2930, the waypoint speed can be multiplied by a gain $G_w$. At 2940, a speed controller adjusts the speed of the follower vehicle based on these scaled factors. In some embodiments, the speed controller can dynamically adjust the values of the gains $G_a$, $G_s$, and $G_w$. For example, the adjustments can be based on desired path curvature, presence of obstacles, operator's preference, and the like. Obstacle detection can be performed by three-dimensional sensors, such as radars, LiDARs, and cameras.

In some embodiments, a predetermined minimum radial distance and/or a predetermined maximum along track distance can be input to the speed controller. The speed control can also be based on the minimum radial distance and/or the maximum along track distance. For example, if the current radial distance is less than or equal to the minimum radial distance, the speed controller can determine the next speed based on the minimum radial distance (e.g., instead of the along path error). In some embodiments, if the radial distance is greater than a maximum along track distance, the system may disengage path following.

Figure 30:
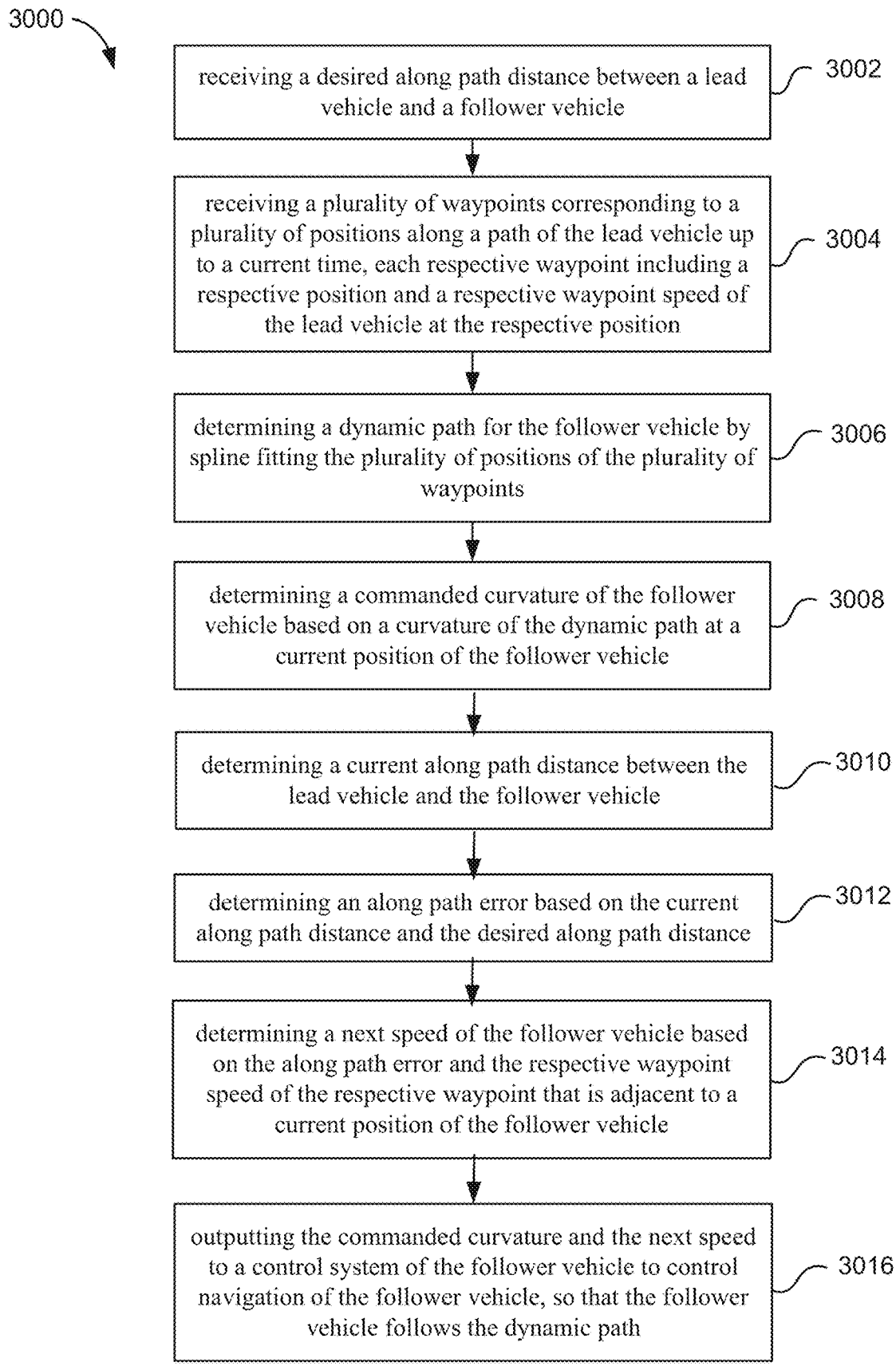
FIG. 30 is a simplified flowchart illustrating a method of maintaining vehicle formation according to some embodiments.

FIG. 30 is a simplified flowchart illustrating a method 3000 of maintaining vehicle formation according to some embodiments.

The method 3000 includes, at 3002, receiving a desired along path distance between a lead vehicle and a follower vehicle; and at 3004, receiving a plurality of waypoints corresponding to a plurality of positions along a path of the lead vehicle up to a current time. Each respective waypoint includes a respective position and a respective waypoint speed of the lead vehicle at the respective position.

The method 3000 further includes, at 3006, determining a dynamic path for the follower vehicle by spline fitting the plurality of positions of the plurality of waypoints.

The method 3000 further includes, at 3008, determining a commanded curvature of the follower vehicle based on a curvature of the dynamic path at a current position of the follower vehicle.

The method 3000 further includes, at 3010, determining a current along path distance between the lead vehicle and the follower vehicle.

The method 3000 further includes, at 3012, determining an along path error based on the current along path distance and the desired along path distance.

The method 3000 further includes, at 3014, determining a next speed of the follower vehicle based on the along path error and the respective waypoint speed of the respective waypoint that is adjacent to a current position of the follower vehicle.

The method 3000 further includes, at 3016, outputting the commanded curvature and the next speed to a control system of the follower vehicle to control navigation of the follower vehicle, so that the follower vehicle follows the dynamic path.

It should be appreciated that the specific steps illustrated in FIG. 30 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 30 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 31:
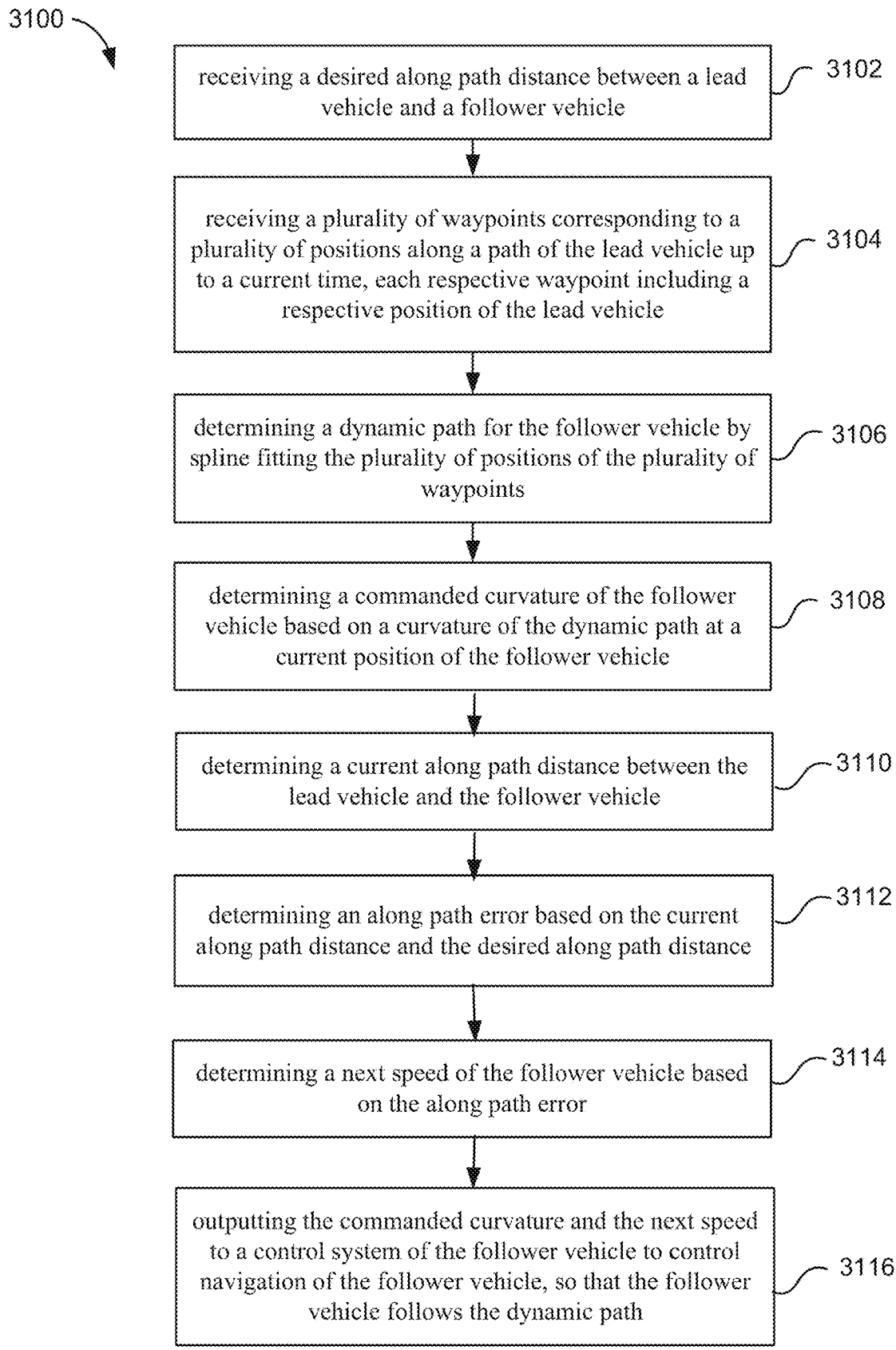
FIG. 31 is a simplified flowchart illustrating a method of maintaining vehicle formation according to some embodiments.

FIG. 31 is a simplified flowchart illustrating a method 3100 of maintaining vehicle formation according to some embodiments.

The method 3100 includes, at 3102, receiving a desired along path distance between a lead vehicle and a follower vehicle; and at 3104, receiving a plurality of waypoints corresponding to a plurality of positions along a path of the lead vehicle up to a current time. Each respective waypoint includes a respective position of the lead vehicle.

The method 3100 further includes, at 3106, determining a dynamic path for the follower vehicle by spline fitting the plurality of positions of the plurality of waypoints.

The method 3100 further includes, at 3108, determining a commanded curvature of the follower vehicle based on a curvature of the dynamic path at a current position of the follower vehicle.

The method 3100 further includes, at 3110, determining a current along path distance between the lead vehicle and the follower vehicle; and at 3112, determining an along path error based on the current along path distance and the desired along path distance.

The method 3100 further includes, at 3114, determining a next speed of the follower vehicle based on the along path error.

The method 3100 further includes, at 3116, outputting the commanded curvature and the next speed to a control system of the follower vehicle to control navigation of the follower vehicle, so that the follower vehicle follows the dynamic path.

It should be appreciated that the specific steps illustrated in FIG. 31 provide a particular method of maintaining vehicle formation according to some embodiments. Other sequences of steps may also be performed according to alternative embodiments. For example, alternative embodiments of the present invention may perform the steps outlined above in a different order. Moreover, the individual steps illustrated in FIG. 31 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 32:
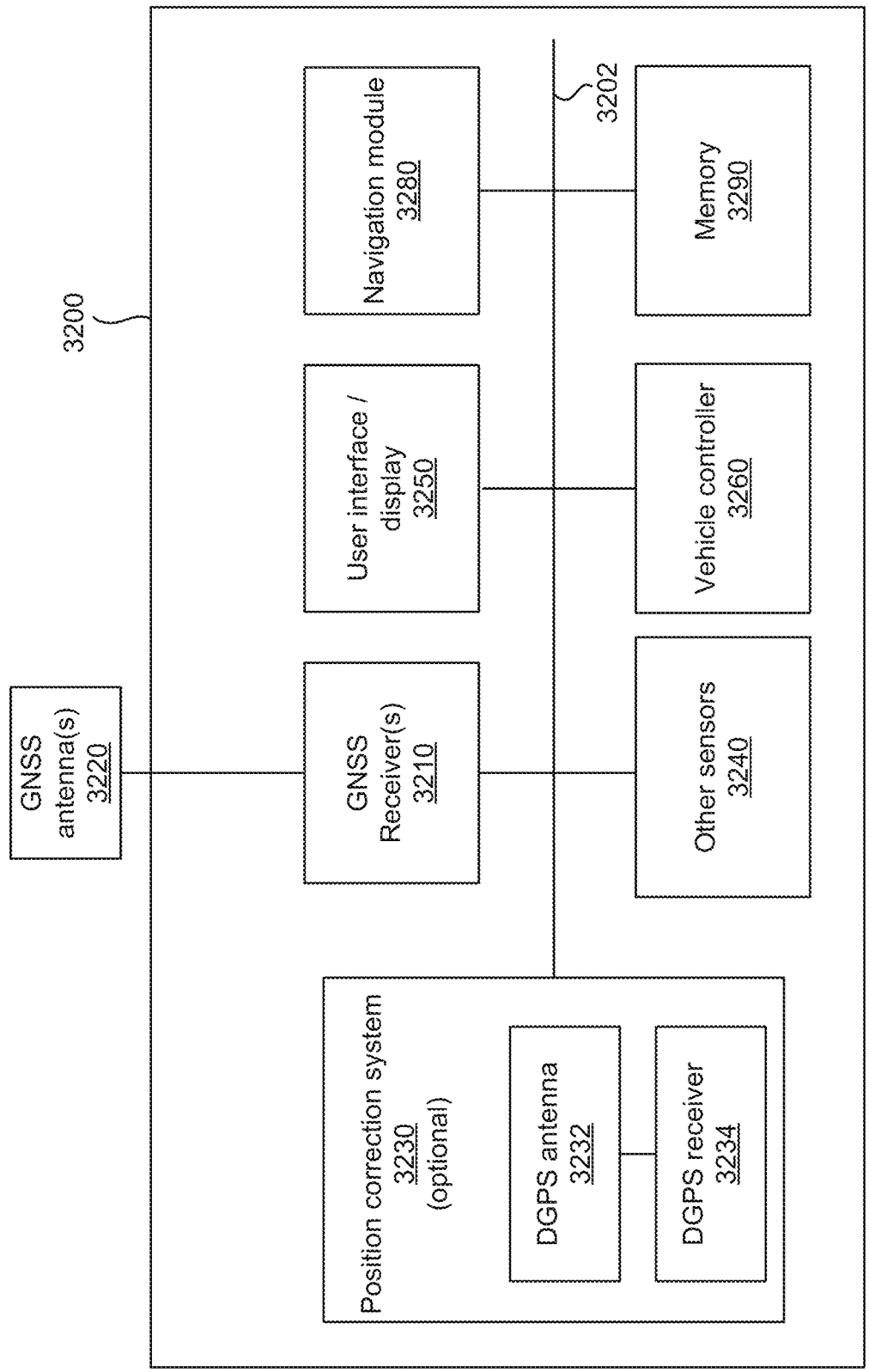
FIG. 32 shows a simplified block diagram of a system for maintaining vehicle formation for a follower vehicle according to some embodiments.

FIG. 32 shows a simplified block diagram of a system 3200 for maintaining vehicle formation for a follower vehicle according to some embodiments. The follower vehicle can be an autonomous vehicle (also referred to as a supervised autonomous vehicle). The system 3200 may include a navigation module 3280, and a user interface 3250. The user interface 3250 may allow a user to start and stop engagement of vehicle formation, specify the type of vehicle formation (e.g., offset following or path following), and/or specifying other parameters (e.g., desired offset distance, maximum radial distance, minimum radial distance, gain values for speed control, etc.). In some embodiments, the user interface 3250 may also include a display. The navigation module 3280 may include one or more computer processors configured to determine a next heading and a next speed of the follower vehicle according to the various embodiments as discussed above. The navigation module 3280 may include a speed controller for determining the next speed.

The system 3200 may include a memory 3290. The memory 3290 may store information needed for the navigation module 3280, as well as other information. For example, the memory 3290 may store the desired offset distance, maximum radial distance, minimum radial distance, gain values for speed control, and the like. The memory 3290 may also store information of pre-planned paths if there are any. The memory 3290 may also store computer-executable instructions to be executed by the computer processors of the navigation module 3280. The memory 3290 may comprise a volatile memory random access memory (RAM), or non-volatile data storage device such as a hard disk drive, flash memory or other optical or magnetic storage device. In some embodiments, the navigation module 3280 may include its own memory.

The system 3200 may include one or more global navigation satellite systems (GNSS) antennas 3220 attached to the follower vehicle and/or the lead vehicle, and one or more GNSS receivers 3210 coupled to the one or more GNSS antennas 3220. The one or more GNSS receivers 3210 may be configured to determine the current position of the follower vehicle and/or the current position of the lead vehicle based on the satellite signals received from GNSS satellites. In some embodiments, the system 3200 may also include an optional position correction system 3230. The position correction system 3230 may include an antenna 3232 and a receiver 3234 for receiving correction data from a reference station or a network of reference stations. For example, the position correction system 3230 may include a differential global positioning system (DGPS). The correction data may be used by the one or more GNSS receivers 3210 to determine a more precise position (e.g., to millimeter or sub-millimeter accuracies) of the follower vehicle and/or the lead vehicle.

The system 3200 may include other sensors 3240. For example, the other sensors 3240 may include LiDAR sensors and/or cameras for obstacle detection, inertial measurement units or IMUs (e.g., accelerometers and gyroscopes), wheel angle sensors, and the like.

The system 3260 may include a vehicle controller 3260. The vehicle controller 3260 may be configured to operate the follower vehicle based on the commands sent by the navigation module 3280. For example, the navigation module 3280 can output a next heading and a next speed for the follower vehicle to the vehicle controller 3260, so that the vehicle controller 3260 can navigate the follower vehicle to maintain a desired vehicle formation.

In some embodiments, the various components of the system 3200 may be interconnected with each other via a bus 3202. In some other embodiments, the various components may be connected with each other in other ways.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of maintaining vehicle formation, the method comprising:
  receiving a desired formation distance between a lead vehicle and a follower vehicle;
  receiving a pre-planned path for the follower vehicle;
  defining a dynamic zone around a current position of the lead vehicle, the dynamic zone having a first boundary extending along a first arc of a first circle and a second boundary extending along a second arc of a second circle, the first circle encompassing the second circle and the dynamic zone comprising an area between the first boundary and the second boundary, the first boundary characterized by a first radius from the current position of the lead vehicle, the first radius being substantially equal to the desired formation distance, and the second boundary characterized by a second radius from the current position of the lead vehicle, the second radius being shorter than the first radius;
  determining a next speed of the follower vehicle based on a current position of the follower vehicle with respect to the first boundary of the dynamic zone, so as to cause the follower vehicle to maintain the desired formation distance from the lead vehicle;
  determining a commanded curvature of the follower vehicle based on the current position of the follower vehicle with respect to the pre-planned path, so as to cause the follower vehicle to follow the pre-planned path while maintaining the desired formation distance from the lead vehicle; and
  outputting the next speed and the commanded curvature to a control system of the follower vehicle for navigation of the follower vehicle.

2. The method of claim 1 wherein the desired formation distance comprises a desired radial distance.

3. The method of claim 1 wherein the first boundary of the dynamic zone is centered around the current position of the lead vehicle.

4. The method of claim 3 wherein the first arc of the first circle encompasses a central angle that is equal to or less than 180 degrees.

5. The method of claim 4 wherein the first arc of the first circle is substantially a semicircle, and a diameter of the semicircle is substantially normal to a current heading of the lead vehicle.

6. The method of claim 4 wherein the dynamic zone is behind the lead vehicle in a pull mode.

7. The method of claim 6 wherein determining the next speed of the follower vehicle comprises:
  in response to determining that the current position of the follower vehicle is located inside the dynamic zone, determining the next speed of the follower vehicle to be less than a current speed of the follower vehicle; and
  in response to determining that the current position of the follower vehicle is located outside the dynamic zone, determining the next speed of the follower vehicle to be greater than a current speed of the follower vehicle.

8. The method of claim 4 wherein the dynamic zone is in front of the lead vehicle in a push mode.

9. The method of claim 8 wherein determining the next speed of the follower vehicle comprises:
  in response to determining that the current position of the follower vehicle is located inside the dynamic zone, determining the next speed of the follower vehicle to be greater than a current speed of the follower vehicle; and
  in response to determining that the current position of the follower vehicle is located outside the dynamic zone, determining the next speed of the follower vehicle to be less than a current speed of the follower vehicle.

10. The method of claim 1 further comprising:
  defining a dynamic geo-fence around the current position of the lead vehicle; and
  in response to determining that the current position of the follower vehicle is outside the dynamic geo-fence, sending a command to the control system of the follower vehicle to cause the follower vehicle to stop.

11. The method of claim 10 wherein the dynamic geo-fence encompasses the dynamic zone and comprises
 a third boundary defined by a third arc about the current position of the lead vehicle, the third arc having a third arc radius that is greater than the first radius of the dynamic zone.

12. The method of claim 11 wherein each of the first arc and the third arc comprises a semicircle.

13. A method of maintaining vehicle formation, the method comprising:
 receiving a desired formation distance between a lead vehicle and a follower vehicle;
 defining a dynamic zone around a current position of the lead vehicle, the dynamic zone having a first boundary extending along a first arc of a first circle and a second boundary extending along a second arc of a second circle, the dynamic zone comprising an area between the first boundary and the second boundary, the first boundary characterized by a first radius from the current position of the lead vehicle, the first radius being substantially equal to the desired formation distance, and the second boundary characterized by a second radius from the current position of the lead vehicle, the second radius being shorter than the first radius;
 determining a next speed and a commanded curvature of the follower vehicle based on the current position of the follower vehicle with respect to the first boundary of the dynamic zone and a path of the lead vehicle, so as to cause the follower vehicle to follow the path of the lead vehicle while maintaining the desired formation distance from the lead vehicle; and
 outputting the next speed and the commanded curvature to a control system of the follower vehicle for navigation of the follower vehicle.

14. The method of claim 13 wherein the desired formation distance comprises a desired radial distance.

15. The method of claim 13 wherein the first boundary of the dynamic zone is centered around the current position of the lead vehicle.

16. The method of claim 15 wherein the first arc of the first circle is substantially a semicircle, and a diameter of the semicircle is substantially normal to a current heading of the lead vehicle.

17. The method of claim 15 wherein the dynamic zone is behind the lead vehicle in a pull mode, and determining the next speed of the follower vehicle comprises:
 in response to determining that the current position of the follower vehicle is located inside the dynamic zone, determining the next speed of the follower vehicle to be less than a current speed of the follower vehicle; and
 in response to determining that the current position of the follower vehicle is located outside the dynamic zone, determining the next speed of the follower vehicle to be greater than a current speed of the follower vehicle.

18. The method of claim 15 wherein the dynamic zone is in front of the lead vehicle in a push mode, and determining the next speed of the follower vehicle comprises:
 in response to determining that the current position of the follower vehicle is located inside the dynamic zone, determining the next speed of the follower vehicle to be greater than a current speed of the follower vehicle; and
 in response to determining that the current position of the follower vehicle is located outside the dynamic zone, determining the next speed of the follower vehicle to be less than a current speed of the follower vehicle.

19. The method of claim 13 further comprising:
 defining a dynamic geo-fence around the current position of the lead vehicle; and
 in response to determining that the current position of the follower vehicle is outside the dynamic geo-fence, sending a command to the control system of the follower vehicle to cause the follower vehicle to stop.

20. The method of claim 19 wherein the dynamic geo-fence encompasses the dynamic zone and comprises
 a third boundary defined by a third arc about the current position of the lead vehicle, the third arc having a third arc radius that is greater than the first radius of the dynamic zone.

\* \* \* \* \*